US006896348B2

(12) United States Patent
Takekoshi et al.

(10) Patent No.: US 6,896,348 B2
(45) Date of Patent: May 24, 2005

(54) INK JET PRINTING APPARATUS, INK JET PRINTING METHOD, PROGRAM, AND PRINTING MEDIUM

(75) Inventors: Rie Takekoshi, Kanagawa (JP); Daigoro Kanematsu, Kanagawa (JP); Mitsutoshi Nagamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/623,543

(22) Filed: Jul. 22, 2003

(65) Prior Publication Data

US 2004/0119767 A1 Jun. 24, 2004

(30) Foreign Application Priority Data

Jul. 23, 2002 (JP) ....................................... 2002-214521

(51) Int. Cl.[7] ......................... B41J 2/205; G06K 15/02

(52) U.S. Cl. ............................ 347/15; 347/43; 347/41; 358/1.9

(58) Field of Search ............................ 347/15, 43, 41; 358/1.2, 1.9, 1.4, 3.01, 3.06, 502, 521, 534

(56) References Cited

U.S. PATENT DOCUMENTS

| | | | | | |
|---|---|---|---|---|---|
| 4,313,124 | A | | 1/1982 | Hara | 346/140 R |
| 4,345,262 | A | | 8/1982 | Shirato et al. | 346/140 R |
| 4,459,600 | A | | 7/1984 | Sato et al. | 346/140 R |
| 4,463,359 | A | | 7/1984 | Ayata et al. | 346/1.1 |
| 4,558,333 | A | | 12/1985 | Sugitani et al. | 346/140 R |
| 4,608,577 | A | | 8/1986 | Hori | 346/140 R |
| 4,723,129 | A | | 2/1988 | Endo et al. | 346/1.1 |
| 4,740,796 | A | | 4/1988 | Endo et al. | 346/1.1 |
| 4,860,026 | A | * | 8/1989 | Matsumoto et al. | 347/15 |
| 5,751,310 | A | | 5/1998 | Yano et al. | 347/43 |
| 5,887,124 | A | | 3/1999 | Iwasaki et al. | 395/109 |
| 5,907,666 | A | | 5/1999 | Yano et al. | 395/109 |
| 6,061,145 | A | * | 5/2000 | Kanda et al. | 358/1.9 |
| 6,145,960 | A | | 11/2000 | Kanda et al. | 347/41 |
| 6,203,133 | B1 | | 3/2001 | Tanaka et al. | 347/15 |
| 2002/0018088 | A1 | | 2/2002 | Takahashi et al. | 347/15 |

FOREIGN PATENT DOCUMENTS

| | | |
|---|---|---|
| JP | 54-56847 | 8/1979 |
| JP | 59-123670 | 7/1984 |
| JP | 59-138461 | 8/1984 |
| JP | 60-71260 | 4/1985 |
| JP | 9-46522 | 2/1997 |

* cited by examiner

*Primary Examiner*—Lamson Nguyen
(74) *Attorney, Agent, or Firm*—Fitzpatrick, Cella, Harper & Scinto

(57) ABSTRACT

The print head is scanned over a printing medium in a sub-scanning direction different from a direction in which the nozzles are arranged. The printing medium is conveyed by a predetermined amount K (where K=a×L (a is a natural number and L is the size of the gradation patterns in the direction in which the nozzles are arranged) or K=L/b (b is a natural number)) in a direction in which the nozzles are arranged, between a preceding scan and a next scan of the print head. Correspondences between image data and the plurality of nozzles are shifted in the direction in which the nozzles are arranged. The operated dot patterns are changed so as to allow the selective use of a plurality of different dot patterns indicating the same gradation value.

18 Claims, 17 Drawing Sheets

GRADATION PATTERNS(8X8)

| | | | | | | | |
|---|---|---|---|---|---|---|---|
| 0 | 128 | 224 | 96 | 8 | 136 | 232 | 104 |
| 192 | 64 | 32 | 160 | 200 | 72 | 40 | 168 |
| 48 | 176 | 208 | 80 | 56 | 184 | 216 | 88 |
| 240 | 112 | 16 | 144 | 248 | 120 | 24 | 152 |
| 140 | 12 | 108 | 236 | 132 | 4 | 100 | 228 |
| 76 | 204 | 172 | 44 | 68 | 196 | 164 | 36 |
| 188 | 60 | 92 | 220 | 180 | 52 | 84 | 212 |
| 124 | 252 | 156 | 28 | 116 | 244 | 148 | 20 |

FIG.13

GRADATION VALUE '0'

GRADATION VALUE '1'

GRADATION VALUE '2'

GRADATION VALUE '3'

GRADATION VALUE '4'

GRADATION
VALUE '1'

INK JET PRINTING APPARATUS, INK JET PRINTING METHOD, PROGRAM, AND PRINTING MEDIUM

This application claims priority from Japanese Patent Application No. 2002-214521 filed Jul. 23, 2002, which is incorporated hereinto by reference.

BACKGROUND OF THE INVENTION

1. Field of the Invention

The present invention relates to an ink jet printing apparatus and method for carrying out printing using a gradation pattern for a systematic dither method and a dot pattern in which dot arrangement information is stored, as well as a program for this ink jet printing method.

2. Description of the Related Art

An ink jet printing apparatus prints an image on a printing medium by causing ink droplets to be ejected through ink ejection openings constituting nozzles in an ink jet print head (hereinafter referred to as a "print head") so that the ink is attached to the printing medium. In a method of causing ink to be ejected from a print head, the ink is ejected through ejection openings by applying an electric signal to heating elements (electrothermal converters) installed near the respective ejection openings to change the state of the ink involving a rapid change in volume (generation of bubbles), thus exerting force based on this change in state. In another method of causing ink to be ejected from a print head, the ink is ejected through ejection openings by using piezoelectric elements (electromechanical converting elements) or the like to change the pressure of the ink on the basis of a mechanical change. Another printing process is a serial scan method of printing an image on a printing medium by repeating a printing operation of causing ink to be ejected from a print head, which is simultaneously moved in a main scanning direction and a conveying operation of conveying the printed medium by a predetermined amount in a sub-scanning direction crossing the main scanning direction.

With an ink jet printing apparatus based on the serial scan method using such a print head, a high-grade image can be printed at a high speed with little noise. Further, a plurality of ejection openings can be densely arranged in the print head in its sub-scanning direction. Thus, this ink jet printing apparatus has a large number of advantages; in spite of its small size, it can easily produce high-resolution printed images and not only monochrome images but also colored images regardless of the size of the printing medium. A print head of what is called a "multi-nozzle" can be provided by integrating together a plurality of ink ejection openings and channels constituting the nozzles so as to allow a plurality of printing elements to be integrally arranged. Further, to print a colored image, a plurality of print heads of a multi-nozzle type are used.

However, with the increased resolution of printed images, an enormous amount of data must be processed in the printing apparatus. Thus, with a print system composed of an image processing section and an ink jet printing section, the throughput of the whole system may decrease sharply because of the speed at which the image processing section processes data or the speed at which the image processing section transfers data to the ink jet printing section. Further, with the increased resolution of printed images, it is necessary to increase the capacity of memory required in the ink jet printing apparatus main body in order to store data. This may increase the cost of the printing apparatus.

Thus, in the recent ink jet printing apparatuses, the image processing section transfers relatively-low-resolution image data subjected to a multivalued quantization process, to the ink jet printing section. The ink jet printing section then carries out printing (dot matrix printing) by expanding the received quantized low-resolution image data into a predetermined matrix.

A systematic dither method is a typical one of the multivalued quantization methods for the image processing section, i.e. the conversions into n values ($n \geqq 3$). The systematic dither method uses dither matrices in which thresholds irrelevant to an input image are regularly arranged and repeatedly arranges dither matrices in a vertical direction and a horizontal direction. Then, the gradation of the input images is expressed by n values ($n \geqq 3$) on the basis of the input image and the thresholds of the corresponding dither matrix. With the common systematic dither process, the regular arrangement (hereinafter also referred to as the "gradation pattern") of the thresholds is of a dot distribution type or a dot concentration type.

FIG. 13 shows gradation patterns of a typical dot distribution type (Beyer type) which represent 256 gradations. These gradations correspond to an 8×8 matrix. The ink jet printing section has a dot matrix corresponding to a gradation value composed of n ($n \geqq 3$) values. A plurality of predetermined dot patterns are stored in this dot matrix. FIGS. 14A to 14C show dot patterns set in a dot matrix and each composed of 2×2 pixels in association with a gradation value composed of five values "0" to "4".

For example, it is assumed that image data is printed by allowing the image processing section to execute a multivalued quantization process to quantize the image data into nine values (4 bits) at a resolution of 300 DPI (horizontal)×300 DPI (vertical) and allowing the ink jet printing section to expand the quantized image data into a 4×2 matrix of resolution 1,200 DPI (horizontal)×600 DPI (vertical). In this case, the image processing section executes a quantizing process with a relatively low resolution of 300 DPI. This reduces loads on the image processing section compared to a quantizing process with a relatively high resolution of 1,200 DPI. Further, one piece of 4-bit image data of resolution 300 DPI corresponds to four pieces of 1-bit image data of resolution 600×600 DPI or to eight pieces of 1-bit image data of resolution 1,200×600 DPI. Thus, the amount of data transferred from the image processing section to the ink jet printing section is half of the amount of data transferred if the ink jet printing section expands the data into a matrix of resolution 600×600 DPI.

Further, Patent Document 1 describes an arrangement in which as a dot pattern with a gradation value of "1" such as the one shown in FIG. 14B, a plurality of dot patterns are provided which are different in the position of each dot in a 2×2 dot matrix so that the dot pattern used can be sequentially changed. Similarly, a plurality of dot patterns with a gradation value "2" or "3" such as those shown in FIGS. 14C and 14D are provided so that the dot pattern used can be sequentially changed. The dot pattern used may be sequentially changed during a single printing scan operation or in accordance with the printed position of the image or may be randomly changed.

[Patent Document 1] Japanese Patent Application Laying-open No. 9-046522 (1997)

However, for the conventional ink jet printing apparatus based on the serial scan method using the systematic dither process, when examining the durability of the print head achieved if images are constantly printed over a long period, the inventors found that an adverse effect on the durability appears periodically in the plurality of nozzles in the print head.

With reference to the accompanying drawings, description will be given of the periodicity of the adverse effect on the nozzles.

With an ink jet printing apparatus based on, for example, a method of utilizing thermal energy to bubble ink to eject ink droplets, images may be degraded that are printed using those of the plurality of nozzles of a print head capable of ejecting ink that are particularly frequently used to eject the ink for printing over a long period. This may be because dyes or impurities in the ink are thermally solidified and deposited on heater surfaces of electrothermal converters used to supply thermal energy to the ink.

In the above conventional example, if the systematic dither method is used to print images constantly over a long period, the nozzles in the print head are not uniformly degraded. As shown in FIG. 15, degraded nozzles through which, for example, ink cannot properly eject appear periodically in the direction in which the nozzles are arranged. This is because the nozzles corresponding to the fixed periodic pattern are used (ink ejection) more frequently than the others. In FIG. 15, the period corresponds to 16 nozzles in turn corresponding to the size of the gradation patterns based on the systematic dither method.

This is because the gradation patterns based on the systematic dither method are repeatedly used in the vertical and horizontal directions within the area in which image data is present, so that the gradation pattern is fixed with respect to the image data. Another cause is that before and after the print head carries out a printing scan in the horizontal direction (main scanning direction), the distance the print head and a printed medium are relatively moved in the vertical direction (sub-scanning direction) becomes an integral multiple of the size of the gradation pattern (or the size of the gradation pattern becomes an integral multiple of the distance the print head is moved relative to the printed medium in the vertical direction during printing scans), so that there is a fixed relationship between the gradation pattern and the positions of the nozzles in the print head.

Furthermore, with respect to the image data expressed by n values ($n \geqq 3$) on the basis of the gradation patterns based on the systematic dither method, the dot pattern for the corresponding dot matrix is used. The nozzles based on this dot pattern are used (ink ejection) more frequently than the others.

For example, FIGS. 10B to 10F show the use (ink ejection) frequency of the nozzles used to print images of half tone densities (duty: 5, 10, 15, and 25%) using the gradation patterns shown in FIG. 13 and the dot patterns shown in FIG. 14. In this case, in order to emphasize the characteristics of the problem, dot patterns are used in which one dot is arranged in a 2×2 dot matrix as shown in FIG. 10A. The use (ink ejection) frequency of the nozzles is periodical on the basis of the size of the gradation patterns based on the systematic dither method, shown in FIG. 13. Thus, the use (ink ejection) frequency of the nozzles shown in FIGS. 10B to 10F corresponds to the number of times (probability) those nozzles are used to print an area of 16×16 dots using the gradation patterns (8×8) in FIG. 13. If, for example, an image of duty 5% is to be printed as shown in FIG. 10B, nozzles 1 and 9 are used twice due to the relationship between the gradation patterns (8×8) in FIG. 13 and the printing area (16×16 dots) and the operated nozzles of the print head as shown in FIG. 17.

The conventional example shown in FIGS. 10B to 10F uses only the pattern in which one dot is located in the upper left of a 2×2 dot matrix as shown in FIG. 10A. Thus, even with an increased halftone density, only every other nozzle is uniformly used as shown in FIG. 10F. Only the nozzles with the odd numbers are used. As a result, the degradation of particular nozzles used more frequently is markedly reflected in a printed image. The degraded nozzles may cause, for example, a variation in the ink ejection direction, a variation in the amount of ink ejected, or even the inability to eject ink.

Further, when degraded nozzles through which, for example, ink cannot properly eject appear significantly periodically, one of a nozzle number L and a nozzle number K is an integral multiple of the other, i.e. the following relationship is established: K=L×a (a is a natural number) or L=K×b. K is the number of nozzles in the print head corresponding to the amount by which a printed medium is conveyed while the print head carries out forward and backward printing scans. Specifically, in an ink jet printing apparatus based on the serial scan method of repeating a printing scan in the main scanning direction of a print head and the conveyance of a printed medium in the sub-scanning direction (along the direction in which nozzles are arranged), K is the number of nozzles in the print head corresponding to the amount by which the printed medium is conveyed. Further L is the size of the gradation patterns based on the systematic dither method in the nozzle arrangement direction and corresponds to the number of nozzles.

For example, if a printing operation is performed by using a print head in which 1,280 nozzles are arranged along the sub-scanning direction and intermittently conveying a printed medium by an amount corresponding to the 1,280 nozzles, then K=1,280. In this case, if a gradation pattern such as those shown in FIG. 13 is used, i.e. if the size of the gradation pattern corresponding to the number of nozzles in the nozzle arrangement direction is 16 as shown in FIG. 17, then K=L×80. That is, degraded nozzles appear significantly periodically as shown in FIG. 15. In contrast, if the size L of the gradation pattern is larger than K, degraded nozzles appear similarly periodically even when L=K×b (b is a natural number).

SUMMARY OF THE INVENTION

It is an object of the present invention to provide an ink jet printing apparatus and method which uses a simple arrangement using dot patterns corresponding to common gradation patterns based on the systematic dither method, to prevent the use of only particular nozzles in a print head, thus delaying the degradation of images or extending the lifetime of the nozzles for stable printing over a long period, as well as a program for this printing method.

In the first aspect of the present invention, there is provided an ink jet printing apparatus based on a serial scan method which prints on a printing medium by using a print head formed with a plurality of nozzles through which ink can be ejected and selectively ejecting ink through the plurality of nozzles in the print head in accordance with dot patterns of dot matrices corresponding to respective gradation values, on the basis of image data converted into n values ($n \geqq 3$) using gradation patterns for a systematic dither method, the apparatus comprising:

- main scanning means for scanning the print head over the printing medium in a sub-scanning direction different from a direction in which the nozzles are arranged;
- conveying means for conveying the printing medium by a predetermined amount K (where K=a×L (a is a natural number and L is the size of the gradation patterns in the direction in which the nozzles are arranged) or K=L/b (b is a natural number)) in the direction in which the nozzles are arranged, between a preceding scan and a next scan of the print head executed by the main scanning means;
- first changing means for shifting correspondences between the image data and the plurality of nozzles in the direction in which the nozzles are arranged; and
- second changing means for changing operated dot patterns so as to allow the selective use of a plurality of different dot patterns indicating the same gradation value.

In the second aspect of the present invention, there is provided an ink jet printing apparatus based on a serial scan method which prints on a printing medium by using a print head formed with a plurality of nozzles through which ink can be ejected and selectively ejecting ink through the plurality of nozzles in the print head in accordance with dot patterns of dot matrices corresponding to respective gradation values, on the basis of image data converted into n values (n≧3) using gradation patterns for a systematic dither method, the apparatus comprising:

main scanning means for scanning the print head over the printing medium in a sub-scanning direction different from a direction in which the nozzles are arranged;

conveying means for conveying the printing medium by a predetermined amount K (where K=a×L (a is a natural number and L is the size of the gradation patterns in the direction in which the nozzles are arranged) or K=L/b (b is a natural number)) in the direction in which the nozzles are arranged, between a preceding scan and a next scan of the print head executed by the main scanning means; and changing means for changing operated dot patterns so as to allow the selective use of a plurality of different dot patterns indicating the same gradation value, wherein the changing means changes the dot patterns for each main scan, each page, or each print job or every time a certain number of print sheets are printed.

In the third aspect of the present invention, there is provided an ink jet printing apparatus based on a serial scan method which prints on a printing medium by using a print head formed with a plurality of nozzles through which ink can be ejected and selectively ejecting ink through the plurality of nozzles in the print head in accordance with dot patterns of dot matrices corresponding to respective gradation values, on the basis of image data converted into n values (n≧3) using gradation patterns for a systematic dither method, the apparatus comprising:

main scanning means for scanning the print head over the printing medium in a sub-scanning direction different from a direction in which the nozzles are arranged;

conveying means for conveying the printing medium by a predetermined amount K (where K=a×L (a is a natural number and L is the size of the gradation patterns in the direction in which the nozzles are arranged) or K=L/b (b is a natural number)) in the direction in which the nozzles are arranged, between a preceding scan and a next scan of the print head executed by the main scanning means; and changing means for shifting correspondences between the image data and the plurality of nozzles in the direction in which the nozzles are arranged, wherein the amount by which the correspondences are shifted by the changing means is less than the L.

In the fourth aspect of the present invention, there is provided an ink jet printing apparatus based on a serial scan method which prints on a printing medium by using a print head formed with a plurality of nozzles through which ink can be ejected and selectively ejecting ink through the plurality of nozzles in the print head in accordance with dot patterns of dot matrices corresponding to respective gradation values, on the basis of image data converted into n values (n≧3) using gradation patterns for a systematic dither method, the apparatus comprising:

main scanning means for scanning the print head over the printing medium in a sub-scanning direction different from a direction in which the nozzles are arranged;

conveying means for conveying the printing medium by a predetermined amount K (where K=a×L (a is a natural number and L is the size of the gradation patterns in the direction in which the nozzles are arranged) or K=L/b (b is a natural number)) in the direction in which the nozzles are arranged, between a preceding scan and a next scan of the print head executed by the main scanning means;

first changing means for shifting correspondences between the image data and the plurality of nozzles in the direction in which the nozzles are arranged; and second changing means for changing operated dot patterns so as to allow the selective use of a plurality of different dot patterns indicating the same gradation value, wherein the first changing means adds data that does not cause any ink to be ejected, as image data corresponding to the first main scan of the print head, to shift the correspondences between the image data and the plurality of nozzles by an amount corresponding to the added data, and wherein the first changing means shifts the correspondences between the image data and the plurality of nozzles and the second changing means changes the dot patterns, for each page or each print job or every time a certain number of print sheets are printed.

In the fifth aspect of the present invention, there is provided an ink jet printing method based on a serial scan method which prints on a printing medium by using a print head formed with a plurality of nozzles through which ink can be ejected and selectively ejecting ink through the plurality of nozzles in the print head in accordance with dot patterns of dot matrices corresponding to respective gradation values, on the basis of image data converted into n values (n≧3) using gradation patterns for a systematic dither method, the ink jet printing method comprising:

a main scanning step of scanning the print head over the printing medium in a sub-scanning direction different from a direction in which the nozzles are arranged;

a conveying step of conveying the printing medium by a predetermined amount K (where K=a×L (a is a natural number and L is the size of the gradation patterns in the direction in which the nozzles are arranged) or K=L/b (b is a natural number)) in the direction in which the nozzles are arranged, between a preceding scan and a next scan of the print head;

a first changing step of shifting correspondences between the image data and the plurality of nozzles in the direction in which the nozzles are arranged; and a second changing step of changing operated dot patterns so as to allow the selective use of a plurality of different dot patterns indicating the same gradation value.

In the sixth aspect of the present invention, there is provided an ink jet printing method based on a serial scan method which prints on a printing medium by using a print head formed with a plurality of nozzles through which ink can be ejected and selectively ejecting ink through the plurality of nozzles in the print head in accordance with dot patterns of dot matrices corresponding to respective gradation values, on the basis of image data converted into n values (n≧3) using gradation patterns for a systematic dither method, the ink jet printing method comprising:

a main scanning step of scanning the print head over the printing medium in a sub-scanning direction different from a direction in which the nozzles are arranged;

a conveying step of conveying the printing medium by a predetermined amount K (where K=a×L (a is a natural number and L is the size of the gradation patterns in the direction in which the nozzles are arranged) or K=L/b (b is a natural number)) in the direction in which the nozzles are arranged, between a preceding scan and a next scan of the print head; and a changing step of changing operated dot patterns so as to allow the selective use of a plurality of different dot patterns indicating the same gradation value, wherein the changing step changes the dot patterns for each main scan, each page, or each print job or every time a certain number of print sheets are printed.

In the seventh aspect of the present invention, there is provided an ink jet printing method based on a serial scan method which prints on a printing medium by using a print head formed with a plurality of nozzles through which ink can be ejected and selectively ejecting ink through the plurality of nozzles in the print head in accordance with dot patterns of dot matrices corresponding to respective gradation values, on the basis of image data converted into n values ($n \geqq 3$) using gradation patterns for a systematic dither method, the ink jet printing method comprising:

a main scanning step of scanning the print head over the printing medium in a sub-scanning direction different from a direction in which the nozzles are arranged;

a conveying step of conveying the printing medium by a predetermined amount K (where $K=a \times L$ (a is a natural number and L is the size of the gradation patterns in the direction in which the nozzles are arranged) or $K=L/b$ (b is a natural number)) in the direction in which the nozzles are arranged, between a preceding scan and a next scan of the print head; and a changing step of shifting correspondences between the image data and the plurality of nozzles in the direction in which the nozzles are arranged, wherein the amount by which the correspondences are shifted by the changing means is less than the L.

In the eighth aspect of the present invention, there is provided an ink jet printing method based on a serial scan method which prints on a printing medium by using a print head formed with a plurality of nozzles through which ink can be ejected and selectively ejecting ink through the plurality of nozzles in the print head in accordance with dot patterns of dot matrices corresponding to respective gradation values, on the basis of image data converted into n values ($n \geqq 3$) using gradation patterns for a systematic dither method, the ink jet printing method comprising:

a main scanning step of scanning the print head over the printing medium in a sub-scanning direction different from a direction in which the nozzles are arranged;

a conveying step of conveying the printing medium by a predetermined amount K (where $K=a \times L$ (a is a natural number and L is the size of the gradation patterns in the direction in which the nozzles are arranged) or $K=L/b$ (b is a natural number)) in the direction in which the nozzles are arranged, between a preceding scan and a next scan of the print head;

a first changing step of shifting correspondences between the image data and the plurality of nozzles in the direction in which the nozzles are arranged; and a second changing step of changing operated dot patterns so as to allow the selective use of a plurality of different dot patterns indicating the same gradation value, wherein the first changing step adds data that does not cause any ink to be ejected, as image data corresponding to the first main scan of the print head, to shift the correspondences between the image data and the plurality of nozzles by an amount corresponding to the added data, and wherein the first changing step shifts the correspondences between the image data and the plurality of nozzles and the second changing step changes the dot patterns, for each page or each print job or every time a certain number of print sheets are printed.

In the ninth aspect of the present invention, there is provided a program for allowing a computer to execute the first changing step and the second changing step of the ink jet printing method.

According to the present invention, the use frequency can be made uniform for all the nozzles in the print head by using the dot patterns and the common gradation patterns based on the systematic dither method to shift the image data in the nozzle arrangement direction and/or change the dot pattern.

This avoids reflecting markedly the characteristics of particular nozzles in a printed image with a particular gradation value. It is also possible to reduce the possibility of degradation of printed images caused by the degradation of the particular nozzles. The degraded nozzles may cause, for example, a variation in the ink ejection direction, a variation in the amount of ink ejected, or even the inability to eject ink.

The above and other objects, effects, features and advantages of the present invention will become more apparent from the following description of embodiments thereof taken in conjunction with the accompanying drawings.

BRIEF DESCRIPTION OF THE DRAWINGS

FIG. 13 is a view illustrating an example of gradation patterns based on the systematic dither method;

DETAILED DESCRIPTION OF PREFERRED EMBODIMENTS

A preferred embodiment of the present invention will be described below in detail with reference to the accompanying drawings.

Figure 1:
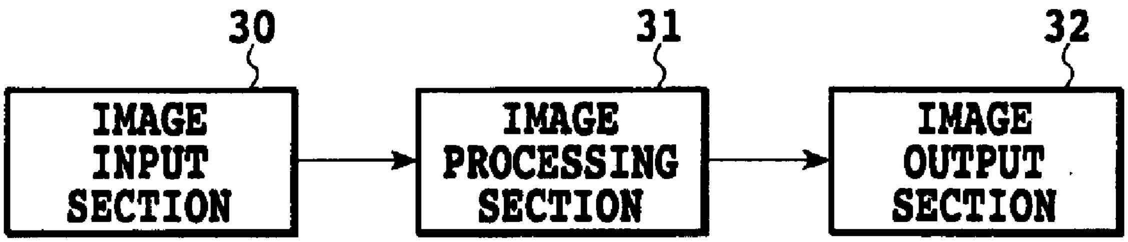
FIG. 1 is a block diagram showing schematically a configuration of an image processing system according to an embodiment of the present invention.

FIG. 1 is a block diagram showing schematically a configuration of an image processing system according to a typical embodiment of the present invention. In FIG. 1, reference numeral 30 denotes an image input section to which multivalued image data from image input equipment such as a scanner or a digital camera or from various storage medium such as a hard disk is inputted. Reference numeral 31 denotes an image processing section that executes image processing on the multivalued image data inputted through the image input section 30 to convert it into image data expressed by n values. Reference numeral 32 is an image output section to which the n-valued image data provided by the image processing section 31 is inputted to form an image. Although not shown, sections constituting this system are provided with a CPU that controls their own operations and cooperative operations with other sections, a ROM storing control programs executed by the CPU, or a RAM used as a work area for executing these control programs.

Figure 2:
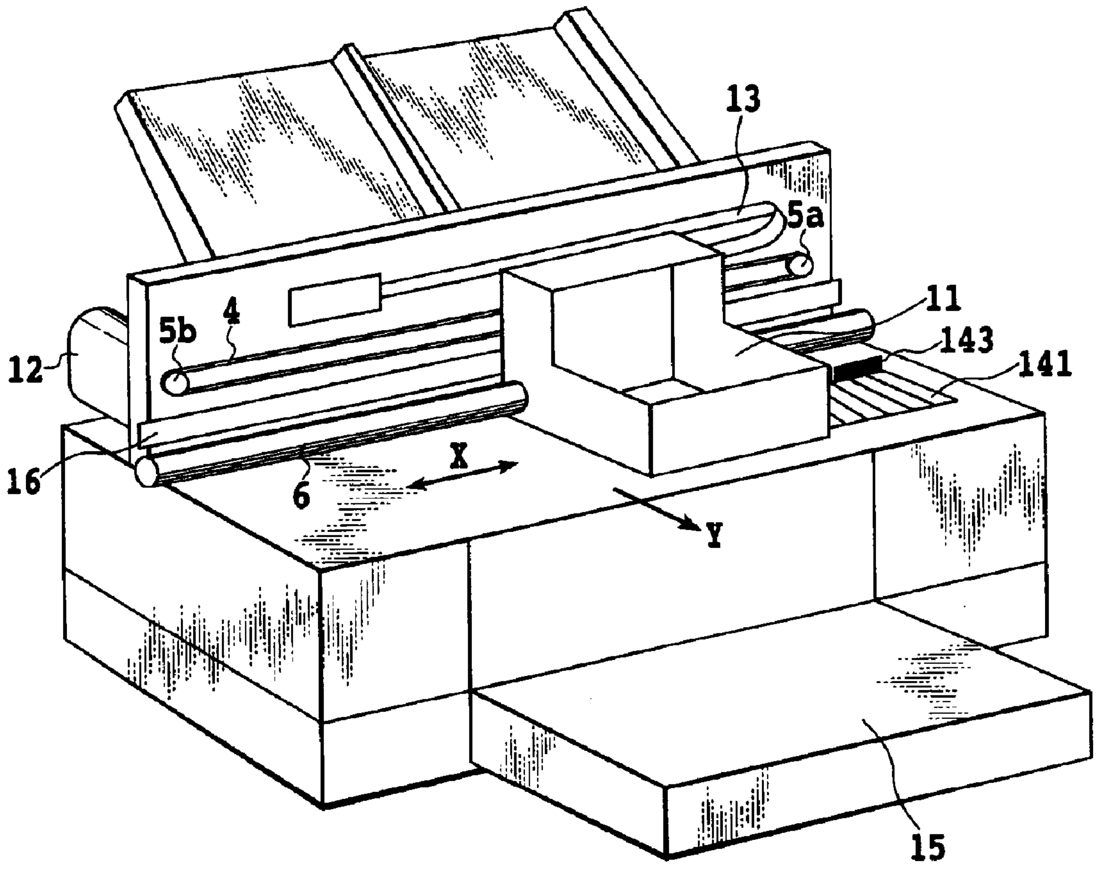
FIG. 2 is a perspective view of the appearance of an ink jet printing apparatus to which the present invention is applicable.

FIG. 2 is a perspective view showing schematically the appearance of a configuration of an ink jet printing apparatus as a typical example of the image output section 32.

In FIG. 2, reference numeral 11 denotes a carriage provided removably with a head cartridge in which a print head and ink tanks reserving ink are integrated together. Reference numeral 12 is a carriage motor that reciprocates the carriage 11 in a main scanning direction shown by an arrow X. Reference numeral 4 denotes a belt that transmits the driving force of the carriage motor 12 to the carriage 11. Reference numeral 6 denotes a guide shaft that supports the carriage 11 so that it can be moved in the main scanning direction. The belt 4 is extended between pulleys 5*a* and 5*b*. Reference numeral 13 denotes a flexible cable used to transfer an electric signal from a control section, described later, to the print head. Reference numeral 15 denotes a cassette in which printing media (for example, print sheets) are stacked. Reference numeral 16 denotes an encoder used to read optically the position of the carriage 11. A conveying mechanism, not shown, is used to convey a printing medium from the cassette 15 in a sub-scanning direction shown by an arrow Y and crossing the main scanning direction.

Reference numerals 141 and 143 denote a cap and a wire blade, respectively, used to execute a recovery process on the print head. The recovery process maintains the proper ink ejection state of the print head and includes an ejection recovery process, a suction recovery process, and wiping. The ejection recovery process causes ink not contributing to the printing of images to be ejected into the cap 141 through the ejection openings of the print head. The suction recovery process introduces a negative pressure into the cap 141, which caps the ejection openings of the print head, to suck and discharge ink from the ejection openings of the print head. The wiping process uses the wiper blade 143 to wipe a surface of the print head in which the ejection openings are formed. The capping, wiping (cleaning), and suction recovery can be carried out using well-known timings, e.g. when the carriage 11 is moved to a predetermined home position area.

Now, description will be given of a configuration of a control system in this printing apparatus.

Figure 3:
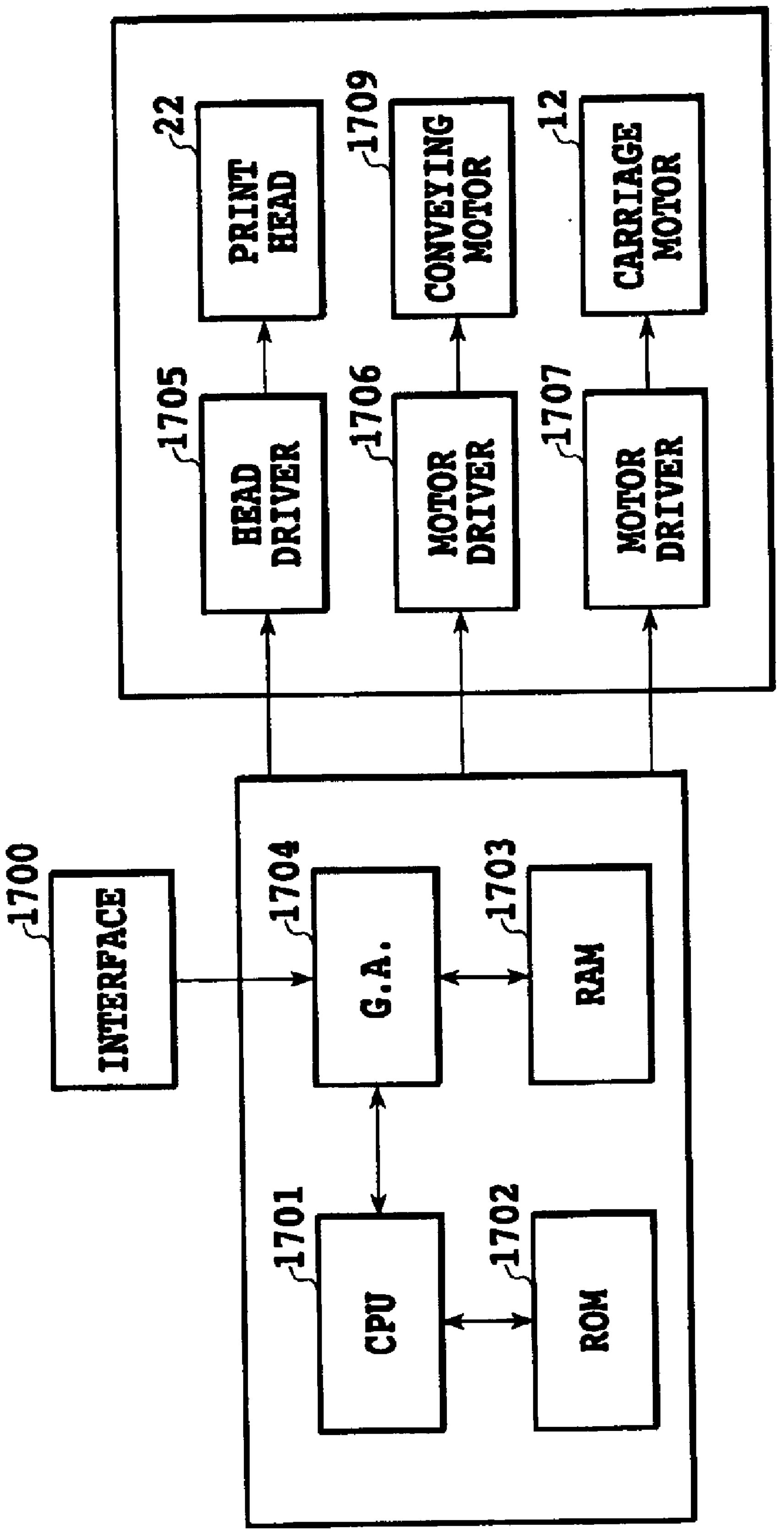
FIG. 3 is a block diagram of a control system in the printing apparatus in FIG. 2.

FIG. 3 is a block diagram showing schematically a configuration of a control circuit in the printing apparatus. In this figure, reference numeral 1700 denotes an interface to which a print signal is inputted, and reference numeral 1701 denotes a CPU. Reference numeral 1702 denotes a ROM that stores control programs and error processing programs executed by the CPU 1701. Reference 1703 denotes a RAM that temporarily saves various data (such as the print signal and print data supplied to the print head 22). Reference numeral 1704 denotes a gate array (G.A.) that controls the supply of print data to the print head 22 and the transfer of data between the interface 1700 and the CPU 1701 and the RAM 1703. Reference numeral 12 denotes a carriage motor used to move the print head 22 in the main scanning direction. Reference numeral 1709 denotes a conveying motor used to convey printing medium in the sub-scanning direction. Reference numeral 1705 denotes a head driver that drives the print head 22. Reference numerals 1706 and 1707 denote motor drivers that drive the conveying motor 1709 and the carriage motor 12, respectively.

When a print signal is inputted to the interface 1700, it is converted into print data between the gate array 1704 and the CPU 1701. Then, the motor drivers 1706 and 1707 are driven. In accordance with the print data transmitted to the head driver 1705, the print head 22 is driven for printing. The print head 22 prints an image by ejecting ink droplets through the ink ejection openings, constituting the nozzles, to attach the ink to a printing medium. In a method of causing ink to be ejected from the print head, the ink is ejected through ejection openings by applying an electric signal to heating elements (electrothermal converters) installed near the respective ejection openings to change the state of the ink involving a rapid change in volume (generation of bubbles), thus exerting force based on this change in state. In another method of causing ink to be ejected from the print head, the ink is ejected through ejection openings by using piezoelectric elements (electromechanical converting elements) or the like to change the pressure of the ink on the basis of a mechanical change.

Figure 4:
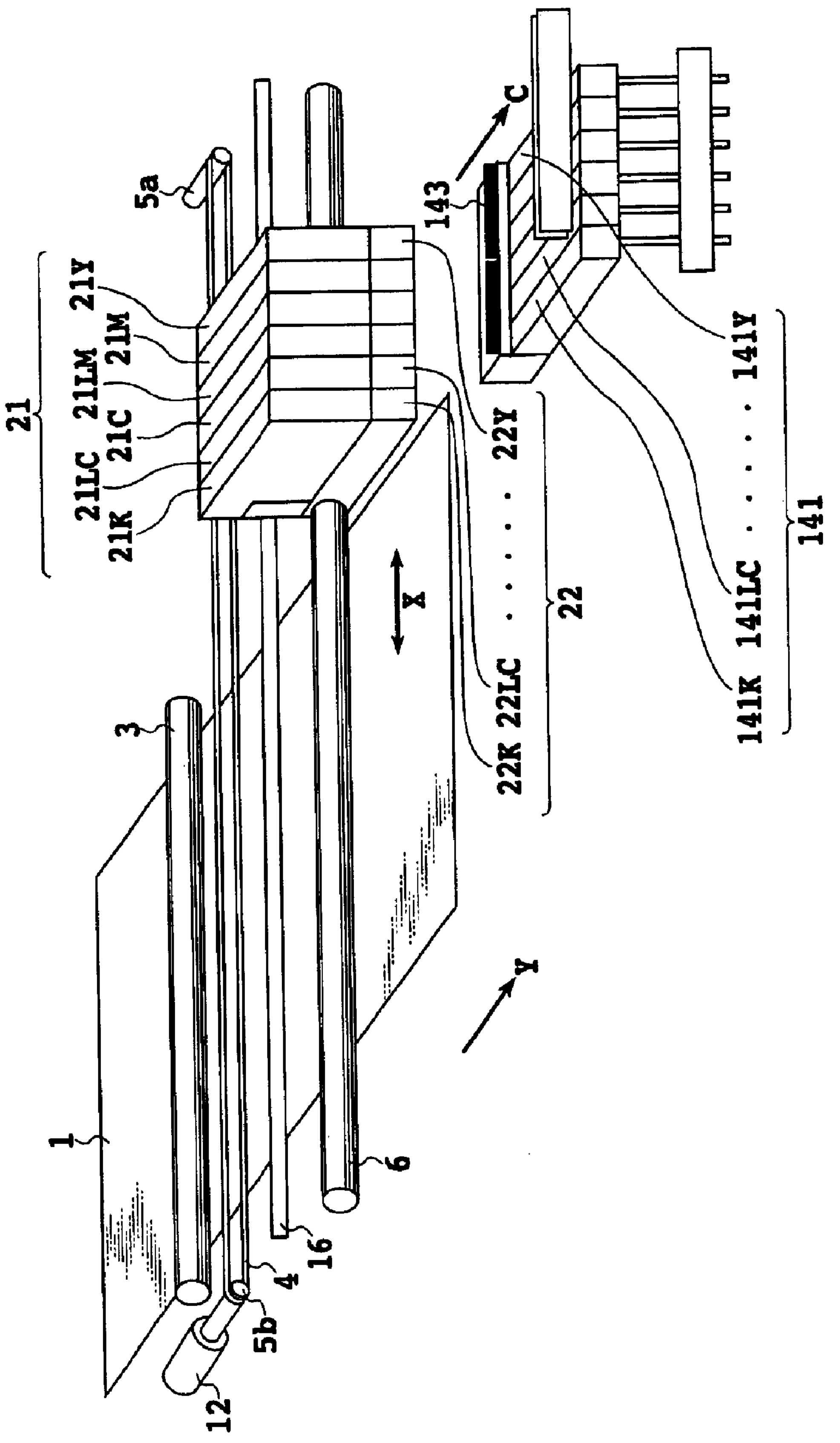
FIG. 4 is a perspective view of an area close to a carriage in the printing apparatus in FIG. 2.

FIG. 4 is a perspective view showing a configuration of components arranged close to the carriage in the printing apparatus in FIG. 2.

The print head 22, shown in FIG. 4, is composed of print heads 22K, 22LC, 22C, 22LM, 22M, and 22Y from which black (K) ink, light cyan (LC) ink, deep cyan (C) ink, light magenta (LM) ink, deep magenta (M) ink, and yellow (Y) ink, respectively, are ejected. Further, the ink tank 21 is composed of ink tanks 21K, 21LC, 21C, 21LM, 21M, and 21Y in which the respective color inks supplied to the corresponding print heads 22 are stored. Furthermore, the cap 141 is composed of six caps 141K, 141LC, 141C, 141LM, 141M, and 141Y used to cap the respective ejection opening formed surfaces (the surfaces in which the corresponding ejection openings are formed) of the print head 22. Reference 3 denotes a conveying roller used to convey a printing medium in the sub-scanning direction.

In this example, the head cartridge is composed of the print head 22 and the ink tank 21. In the head cartridge, the print head 22 and the ink tank 21 may be integrated together or may be separable from each other.

Figure 5:
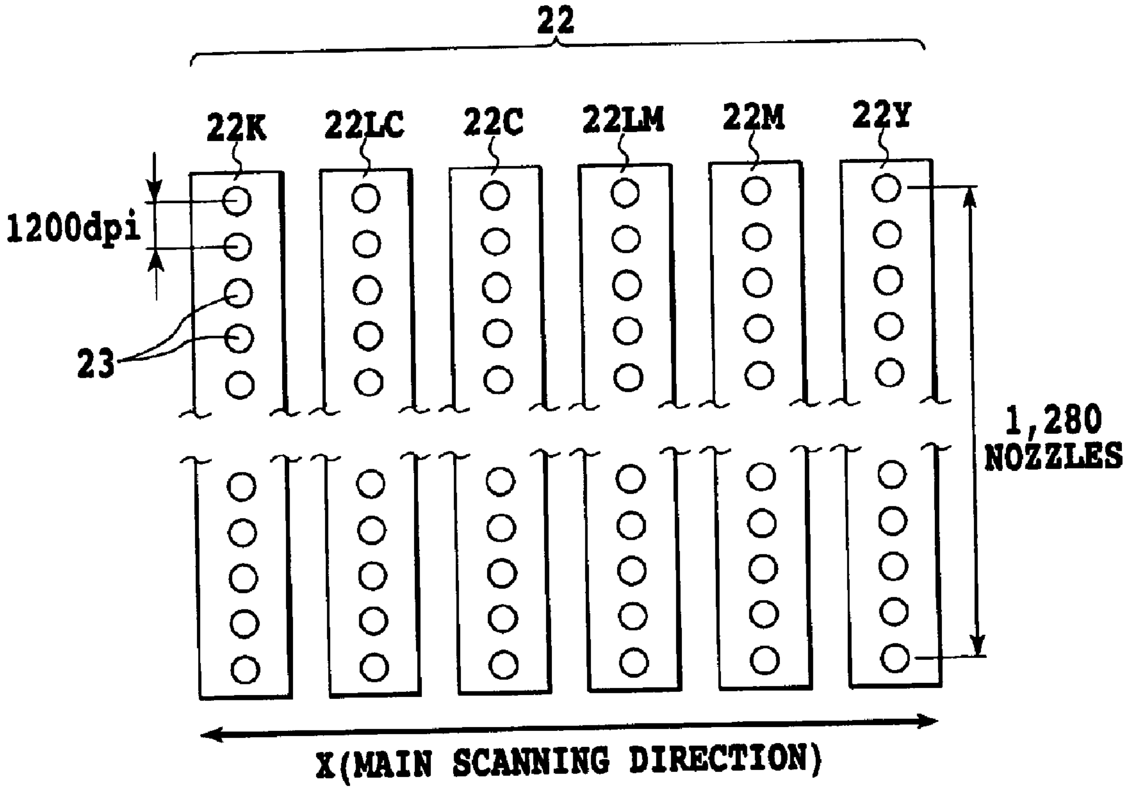
FIG. 5 is a view of a print head in FIG. 4 as viewed from its ejection opening side.

FIG. 5 is a view of the print head 22 as shown from its ejection opening 23 side.

As shown in FIG. 5, each print head 22 is formed with 1,280 ejection openings arranged in a line so as to accomplish a print density of 1,200 dpi. About 4 ng of ink is ejected through each ejection opening 23.

Figure 6:
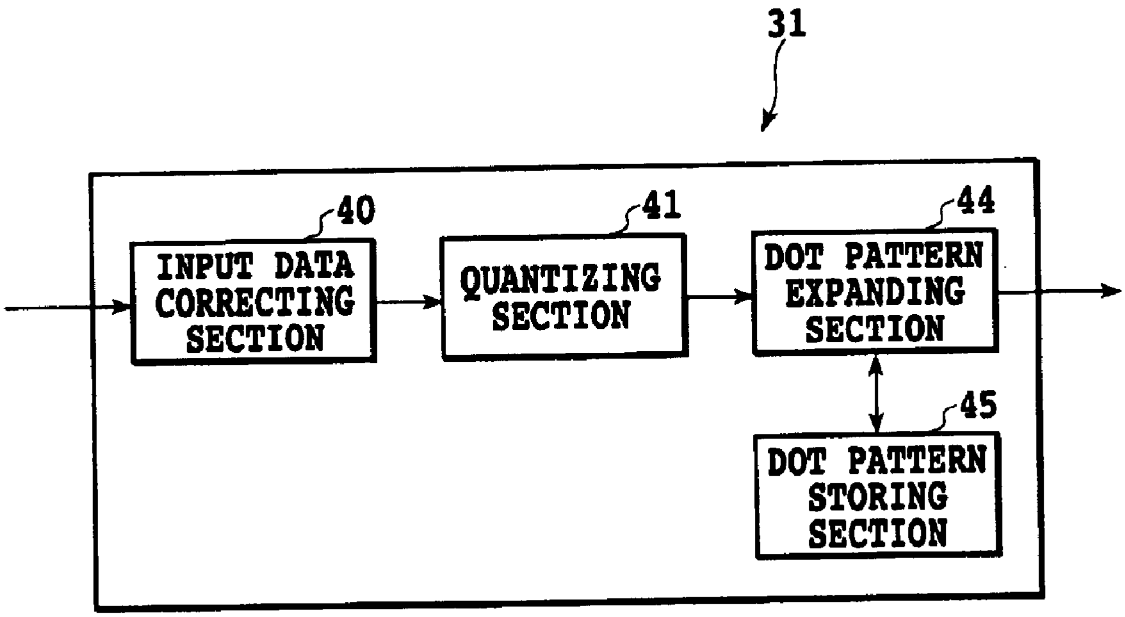
FIG. 6 is a block diagram of an image processing section in FIG. 1.

FIG. 6 is a block diagram of the image processing section 31 in FIG. 1.

In FIG. 6, reference numeral 40 denotes a data correcting section to which multivalued image data (for example, multivalued image data in which one pixel is expressed by 8 bits (256 gradations)) is inputted to correct input image data by adding error data obtained from an already quantized image to image data on the current pixel. Reference numeral 41 denotes a quantizing section that quantizes the multivalued image data corrected by the input data correcting section 40 into a gradation value composed of "N" values. The N values are determined from the relationship between input resolution and output resolution. For example, when the input resolution is 300 dpi and the output resolution is 600 dpi, input image data in which one pixel is expressed by 8 bits is converted into output data in which one block is composed of four 2×2 dots. Five gradations can be expressed using one block. Consequently, the quantizing section 21 outputs five quantized values "0", "64", "128", "192", and "255". These quantized values correspond to gradation values "0", "1", "2", "3", and "4".

Reference numeral 44 denotes a dot pattern expanding section that selects one of a plurality of dot patterns corresponding to the respective gradation values, on the basis of a gradation value quantized by the quantizing section 41. The selected desired dot pattern is obtained from a dot pattern storing section 45. The dot pattern storing section 45 stores the plurality of dot patterns corresponding to the respective gradation values. The dot pattern storing section 45 selects a desired one of the plurality of dot patterns on the basis of dot pattern selection information inputted from the dot pattern expanding section 44. The dot pattern storing section 45 then outputs the selected dot pattern to the dot pattern expanding section 44. The dot pattern storing section 45 is provided in a semiconductor memory such as an EEPROM. However, in the image printing apparatus according to the present invention, it may be copied to a fast memory such as a SRAM in order to increase the processing speed.

In the present embodiment, the dot patterns stored in the dot pattern storing section 45 each have a 2×2 dot size for the corresponding gradation value. That is, as shown in FIGS. 14A to 14E, independent dot pattern tables of a 2×2 dot size are provided for the respective gradation values of "0", "1", "2", "3", and "4".

Now, description will be given of a printing operation performed by the printing apparatus configured as described above.

Ink from the ink tank 21 is supplied to the print head 22. The print head ejects ink onto the printing sheet 1 in accordance with an image signal while moving in the main scanning direction. This allows the printing of an image of a width W corresponding to the number of ejection openings 23 of the print head 22. This printing operation is performed by driving the print head 22 on the basis of an image signal using a read timing provided by an encoder 16, to eject and attach ink droplets to the printing sheet 1. Then, once a printing operation is finished for one scan (in FIG. 7, the n-th scan), before the next scan is started using the next image data (in FIG. 7, the n+1-th scan), the pair of conveying rollers 3 is driven to convey intermittently the printing sheet 1 by a predetermined amount in the sub-scanning direction.

The printing sheet 1 is printed by thus repeating a printing operation for one scan and the conveyance of the printing sheet 1 by the predetermined amount.

Figure 8:
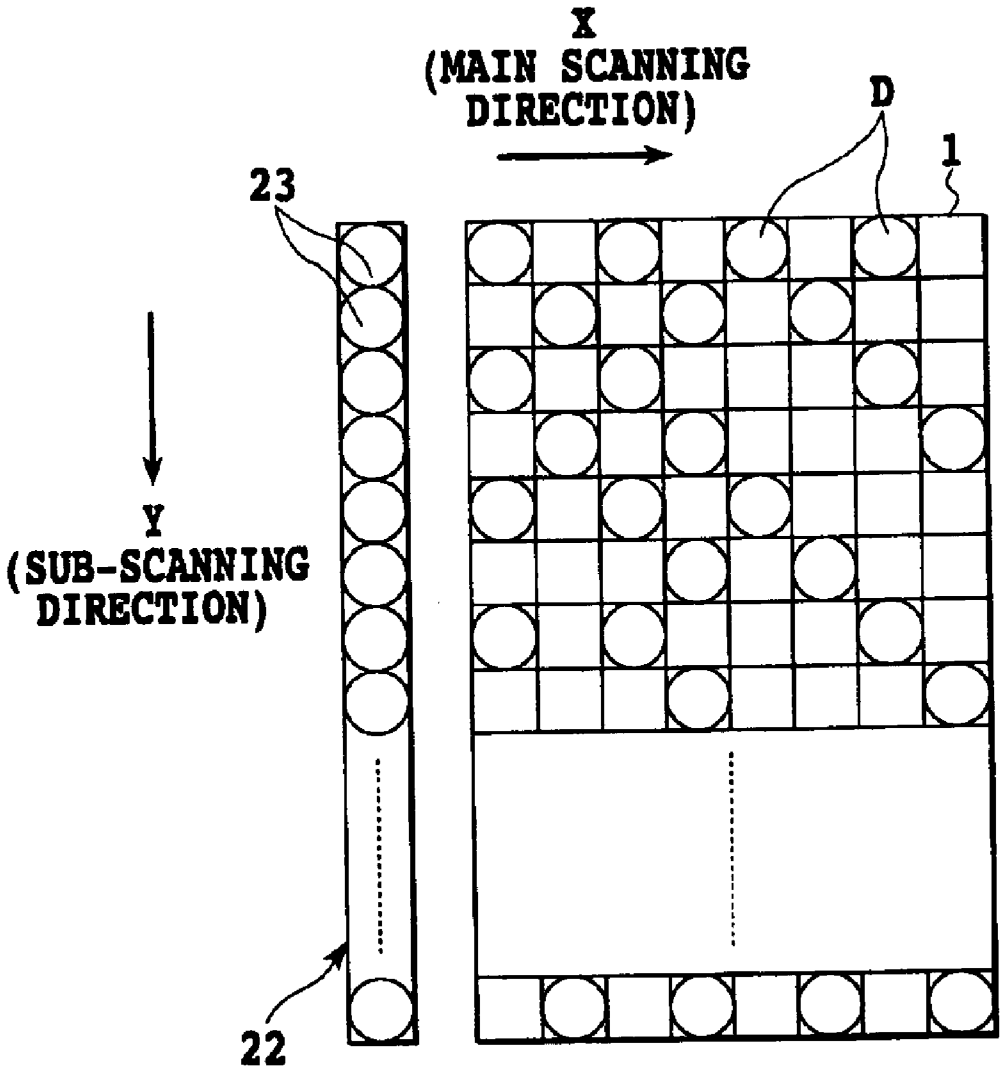
FIG. 8 is a view illustrating the relationship between the nozzles of the print head and the arrangement of dots formed by ink ejected through the nozzles.

FIG. 8 is a view showing an example of the relationship between the ejection openings 23 of the print head 22 and the arrangements of dots D formed on the printing sheet 1 using ink ejected through the ejection openings 23. In the present embodiment, for simplification of the description, the dot pattern size is 2×2 dots. However, the dot pattern size to which the present invention is applicable is not limited to this aspect. Dot patterns of other sizes may be used.

In the present embodiment, 2×2 dot patterns correspond to conventionally common gradation patterns based on the systematic dither method. In the present embodiment, the dot patterns are changed every time the print head has carried out one scan.

Specific description will be given of the dot patterns according to the present embodiment.

FIGS. 9B to 9F show the use frequency of nozzles used (ink ejection) to print images of halftone densities (duty: 5, 10, 15, and 25%) using the gradation patterns shown in FIG. 13 and dot patterns according to the present embodiment. Again, for simplification of the description, in order to emphasize the characteristics of effects, dot patterns are used in which only one dot is arranged in 2×2 dot matrix, as shown in FIG. 9A, i.e. dot patterns indicative of a gradation value of "1" included in the five quantized gradation values. In FIGS. 9B to 9F, the use (ink ejection) frequency of the nozzles is periodical on the basis of the size of the gradation patterns based on the systematic dither method, shown in FIG. 13. Thus, the use (ink ejection) frequency of the nozzles corresponds to the number of times (probability) those nozzles are used which are used to print an area of 16×16 dots.

Figures 10A, 10B, 10C, 10D, 10E, 10F:
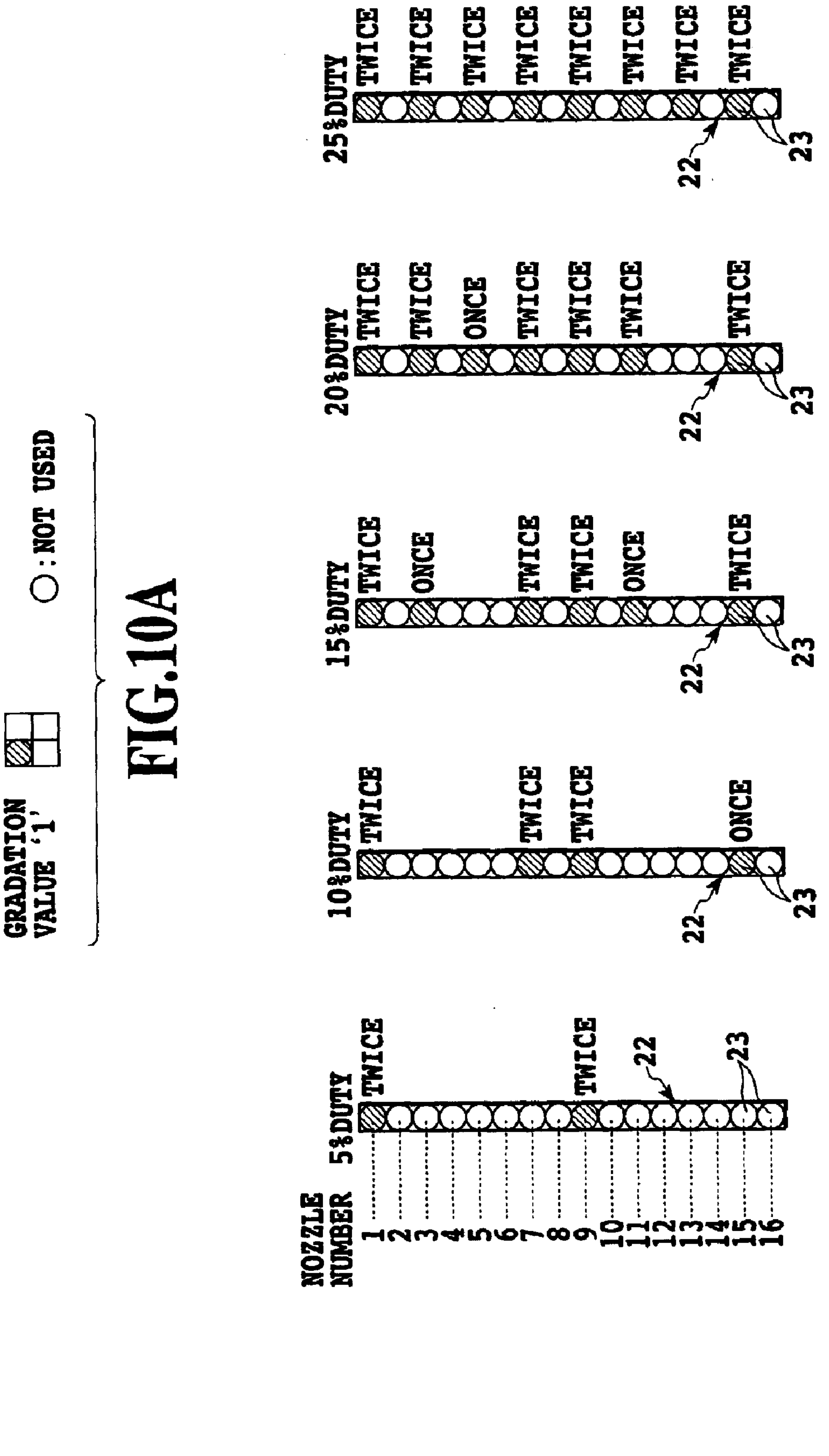
FIG. 10A is a view illustrating a dot pattern used in a conventional example.
FIGS. 10B to 10F are views illustrating the use frequency of the nozzles observed when the dot pattern in FIG. 10A is used to print images of different densities.

As in the case with the previously described conventional example shown in FIGS. 10B to 10F, if it is assumed various images are printed and if images of halftone densities (duty: 5, 10, 15, and 25%) are printed, then only the pattern is fixedly used in which one dot is located in the upper left of a 2×2 dot matrix as shown in FIG. 10A. Thus, even with an increased halftone density, only every other nozzle is uniformly used as shown in FIG. 10F. Only the nozzles with odd numbers are used. As a result, the degradation of particular nozzles used more frequently is markedly reflected in a printed image. The degraded nozzles may cause, for example, a variation in the ink ejection direction, a variation in the amount of ink ejected, or even the inability to eject ink.

Figures 9A, 9B, 9C, 9D, 9E, 9F:
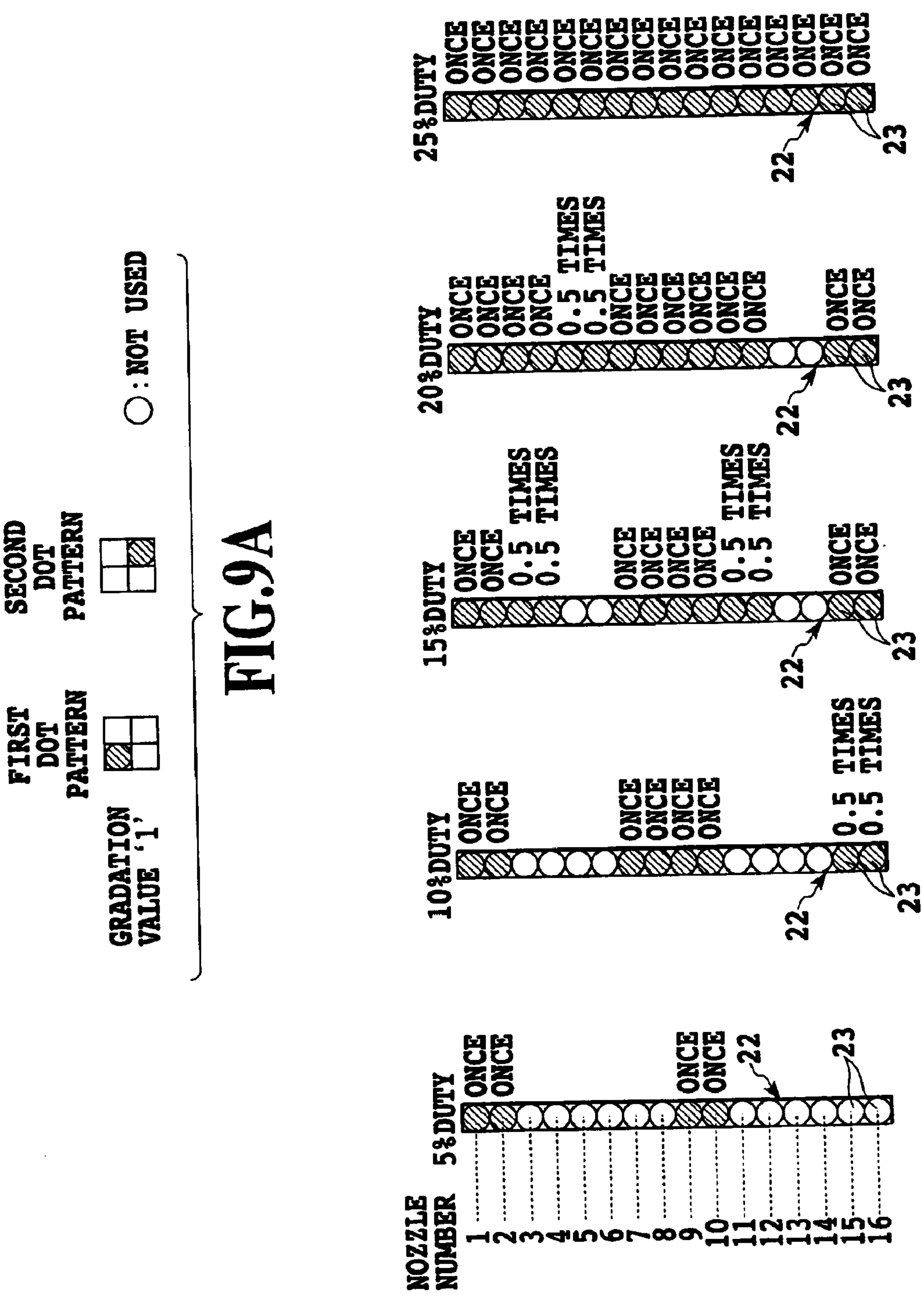
FIG. 9A is a view illustrating two dot patterns used in an embodiment of the present invention.
FIGS. 9B to 9F are views illustrating the use frequency of the nozzles observed when the two dot patterns in FIG. 9A are used to print images of different densities.

In the present example in FIGS. 9B to 9F, a first and a second dot patterns are used as dot pattern of a gradation value of "1"; in the first dot pattern, one dot is located in the upper left of a 2×2 dot matrix, and in the second dot pattern, one dot is located in the lower right of the 2×2 dot matrix, as shown in FIG. 9A. With the first dot pattern, nozzles with odd numbers are used, whereas with the second dot pattern, nozzles with even numbers are used. The first and second dot patterns are switched for each scan of the print head 22. As a result, ink is ejected through the nozzles with the odd and even numbers to make the use frequency of all the nozzles in the print head 22 uniform.

Processing with these dot patterns is executed by the dot pattern expanding section 44 and dot pattern storing section 45, shown in FIG. 6. However, this processing may be carried out by an exclusive logic circuit or by allowing the CPU to execute a corresponding processing program. An expanded dot pattern is transferred to the ink jet printer. On the basis of the specified dot pattern, the print head 22 ejects ink for printing.

Thus, in the present embodiment, if a printing operation is performed by ejecting ink from the print head 22 on the basis of dot patterns corresponding to quantized gradation values, then a plurality of dot patterns are provided even for the same gradation value so that only the same nozzles are used for ink ejection. Then, the different dot patterns are selectively used for the same gradation value by changing the plurality of dot patterns provided for this gradation value using predetermined timings (in the present embodiment, for each scan of the print head 22). This distributes used nozzles within the plurality of nozzles. Thus, this hinders the characteristics of particular nozzles from being markedly reflected in a printed image with a particular gradation value. For example, this reduces the possibility of the degradation of a printed image resulting from the degradation of particular nozzles. The degraded nozzles may cause, for example, a variation in the ink ejection direction, a variation in the amount of ink ejected, or even the inability to eject ink.

In the above embodiment, the dot patterns are changed every time the print head 22 finishes one scan. Compared to the change timings disclosed in Patent Document 1, described above, the present arrangement eliminates the need to switch the dot pattern in real time to enable rewrites based on software. This preferably enables the hardware configuration to be simplified to reduce the cost of the main body.

Further in the present embodiment, it is not necessary to change the dot patterns for each scan. For example, if the arrangement of dots cannot be changed within one page of the printing sheet 1 on which an image is printed, then the dot pattern can be changed for each page so as to make the use frequency of all the nozzles of the print head 22 uniform as the number of pages increases. Further, similarly, all the nozzles can be uniformly used by changing the dot pattern for each of the user's jobs or every time a certain number of sheets are printed.

If the dot patterns are changed for each page, a small difference in image quality associated with the switching of the dot pattern is less marked because it appears between pages. Further, if the dot patterns are changed for each job, a small difference in image quality associated with the switching of the dot pattern is less marked because it appears between jobs. Furthermore, if the dot patterns are changed every time a certain number of sheets are printed, a small difference in image quality associated with the switching of the dot pattern is less marked because it appears after the certain number of print sheets have been printed.

Figure 16A:
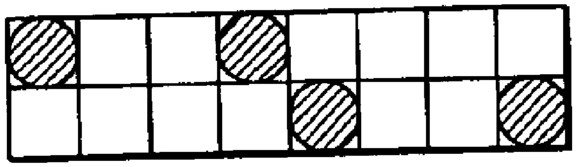
FIGS. 16A and 16B are views illustrating different dot patterns with a gradation value of 1 in which four 2×2 dot patterns are arranged.
Figure 16B:
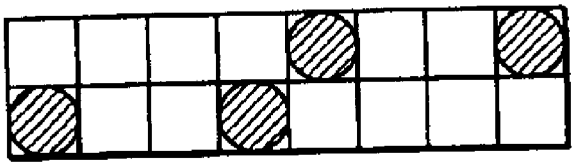

Further, in the present embodiment, the dot pattern is composed of 2×2 dots. However, the present embodiment is not limited to this dot pattern. For example, if a dot matrix in which four 2×2 dot patterns are arranged as shown in FIG. 16A is used as a dot pattern with a gradation value of "1" in order to distribute the operated nozzles within the dot matrix, then only particular nozzles may be used because the use (ink ejection) frequency of the nozzles is periodical on the basis of the size of the gradation patterns based on the systematic dither method, shown in FIG. 13. Even in this case, as with the present embodiment, all the nozzles can be uniformly used by switching between the dot pattern in FIG. 16A and the different dot pattern in FIG. 16B using predetermined timings.

Consequently, with the present embodiment, if the dot patterns corresponding to the conventionally common gradation patterns based on the systematic dither method are used, the degradation of images attributed to the biased use of particular nozzles, which is a problem with the recent ink jet apparatuses, can be avoided by changing the dot pattern for each scan of the print head 22.

(Other Embodiments)

In the above embodiment, if the dot patterns corresponding to the conventionally common gradation patterns based on the systematic dither method are used, then the dot patterns are changed for each scan of the print head 22. The dot patterns may be changed for each printing scan, each page, or each job, or every time a certain number of print sheets are printed. In the present embodiment, the dot patterns are not only changed but the correspondences between the nozzles of the print head 22 and print data are also changed for each page of the printing sheet. Thus, even if the printed image has a lower halftone density, it is possible to make more reliably the use frequency of all the nozzles of the print head 22 uniform. Further, the correspondences between the nozzles of the print head 22 and print data may be changed for each printing scan, each page, or each job, or every time a certain number of print sheets are printed. Furthermore, this change timing may be combined with the change timing for the dot pattern. Moreover, in the present embodiment, the use frequency of all the nozzles in the print head 22 can be more reliably made uniform simply by changing the correspondences between the nozzles in the print head 22 and print data for each page of the printing sheet without any combinations with the above embodiment.

The present embodiment will be specifically described below.

Figure 11A:
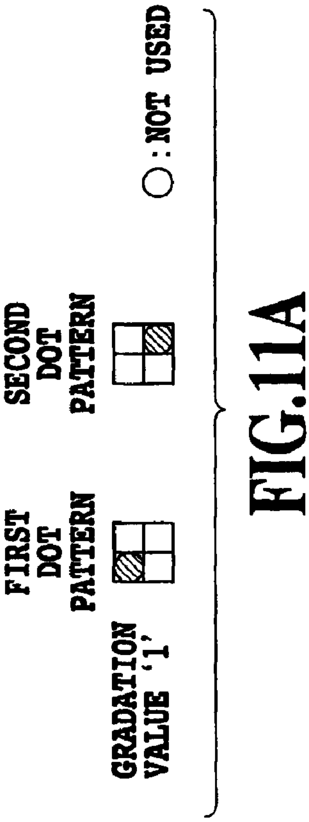
FIG. 11A is a view illustrating the two dot patterns used in another embodiment of the present invention.
Figures 11B, 11C, 11D, 11E, 11F:
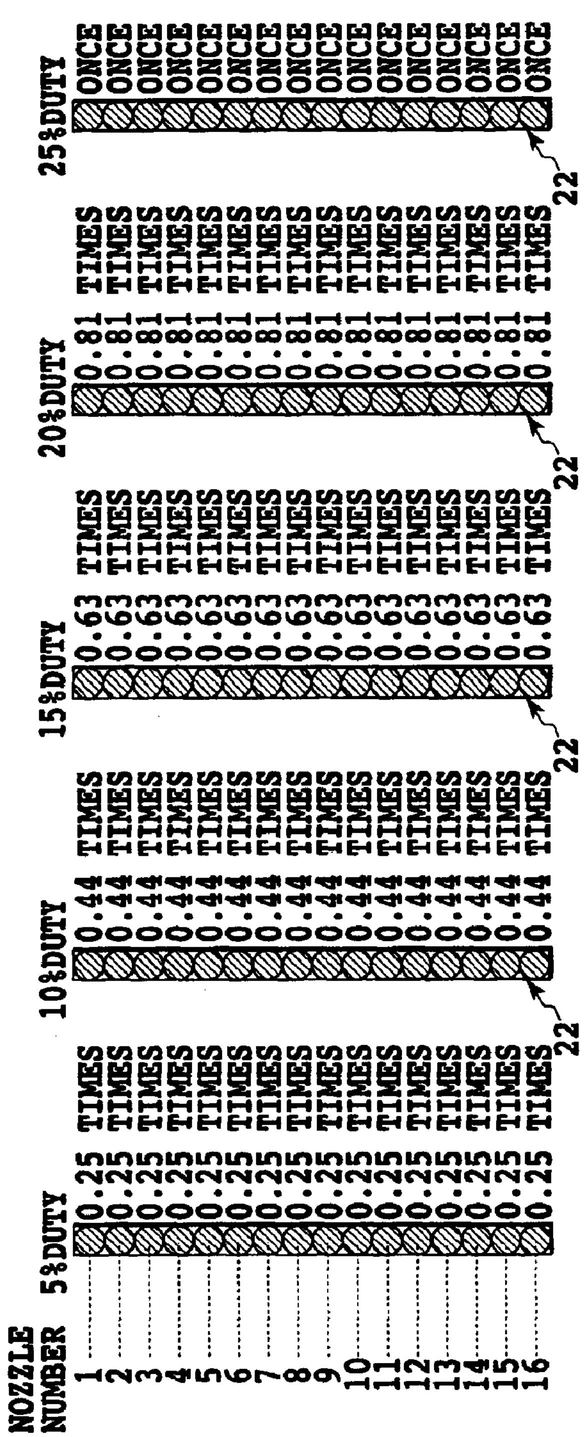
FIGS. 11B to 11F are views illustrating the use frequency of the nozzles observed when images of different densities are printed by using the two dot patterns in FIG. 11A and changing the correspondences between the nozzles and image data.

FIGS. 11B to 11F show the use (ink ejection) frequency of the nozzles used to print images of half tone densities (duty: 5, 10, 15, and 25%). Again, for simplification of the description, in order to emphasize the characteristics of effects, dot patterns are used in which only one dot is arranged in 2×2 dot matrix, as shown in FIG. 11A, i.e. dot patterns indicative of a gradation value of "1" included in the five quantized gradation values. In FIGS. 11B to 11F, the use (ink ejection) frequency of the nozzles is periodical on the basis of the size of the gradation patterns based on the systematic dither method, shown in FIG. 13. Thus, the use (ink ejection) frequency of the nozzles corresponds to the number of times (probability) those nozzles are used which are used to print an area of 16×16 dots.

Not only in the conventional example shown in FIGS. 10B to 10F but also in the embodiment shown in FIGS. 9A to 9F, in which all the nozzles are uniformly used by changing the dot pattern for each scan of the print head 22, a tendency to use only particular nozzles is unavoidable when printing an image of a lower halftone density. This is because the tendency results from thresholds for the gradation patterns based on the systematic dither process.

Figure 7:
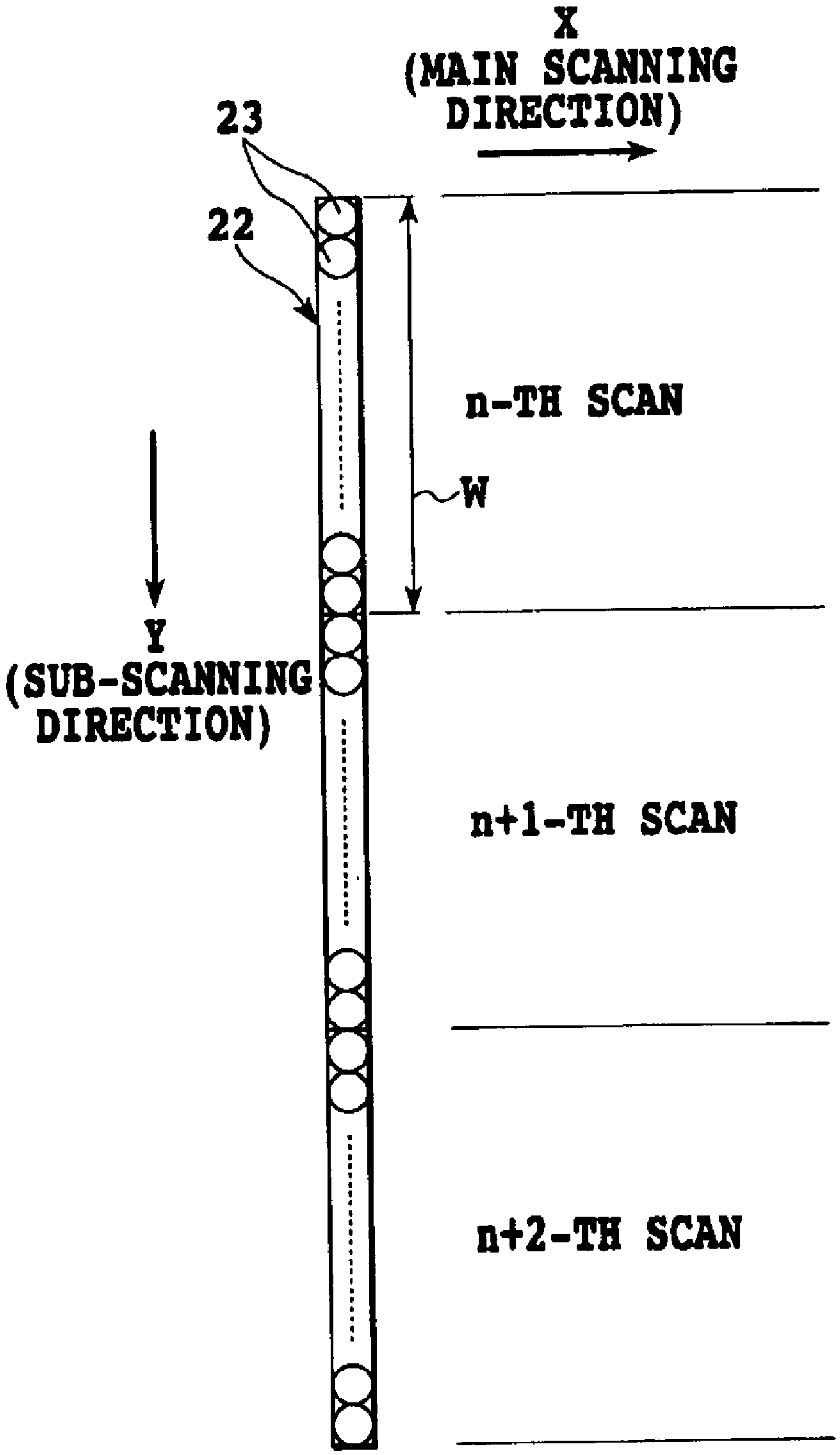
FIG. 7 is a view illustrating the relationship between the printing width of the print head and its printing scan.

In the present embodiment, in order to make more reliably the use frequency of all the nozzles in the print head 22 uniform, the first and second patterns are not only changed for each scan of the print head 22 as in the embodiment shown in FIGS. 9A to 9F but the positions of the operated nozzles of the print head 22 are changed for each page of the printing sheet. In the present embodiment, for simplification of the description, a printing method similar to the one shown in FIG. 7 is employed, i.e. a one-pass printing method of causing the print head 22 to carry out one scan to complete an image of a width W corresponding the number of the ejection openings 23 of the print head 22 (corresponding to 1,280 nozzles).

First, if an image for the first page is printed, then during the first scan, the printing sheet is printed for the width W corresponding to the 1,280 nozzles of the print head 22 as in the conventional manner. During the second and subsequent scans, the printing sheet is printed for the width W corresponding to the 1,280 nozzles of the print head 22 so that printed images sequentially succeed the image printed during the first scan. Thus, the entire image is printed in the first page of the printing sheet.

Figure 12A:
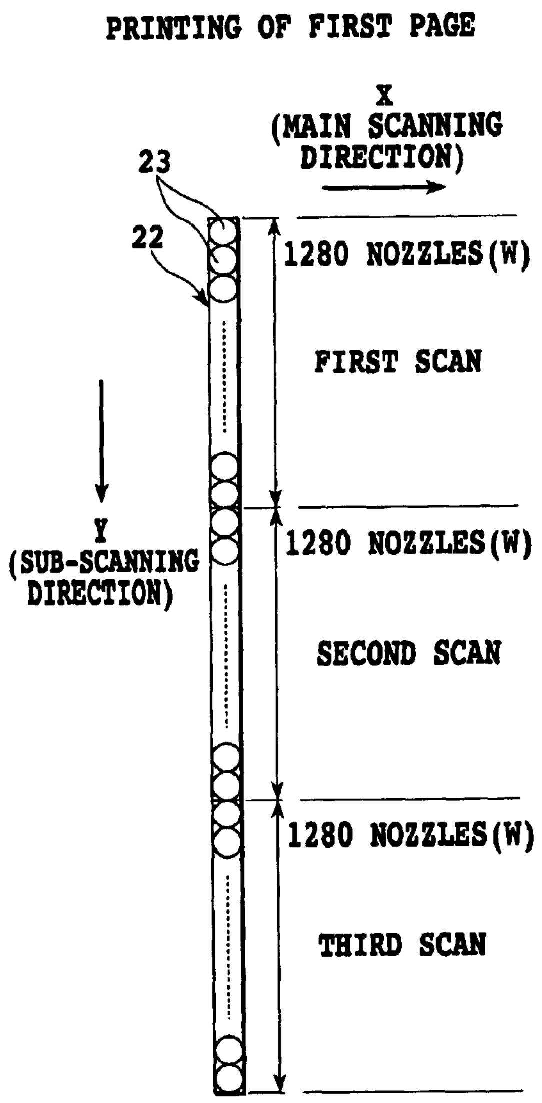
FIG. 12A is a view illustrating the relationship between the print head and its printing scan observed when a first page is printed according to this embodiment of the present invention.
Figure 12B:
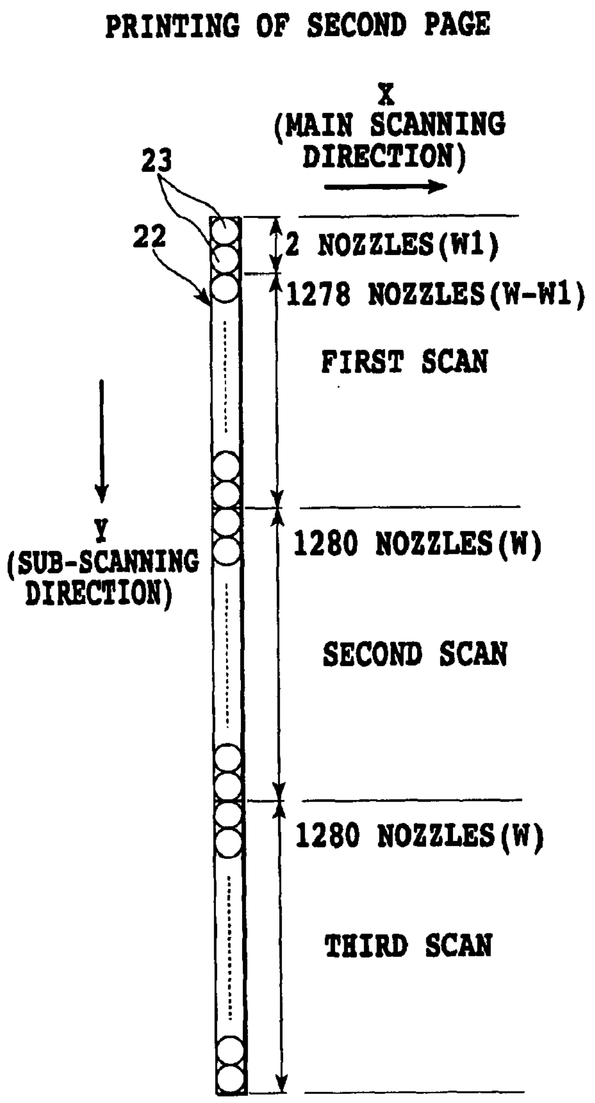
FIG. 12B is a view illustrating the relationship between the print head and its printing scan observed when a second page is printed according to this embodiment of the present invention.
Figure 14A:
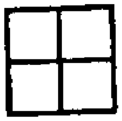
FIGS. 14A to 14E are views illustrating examples of dot patterns with a gradation value of 0 to 4.
Figure 14B:
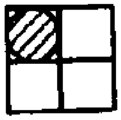
Figure 14C:
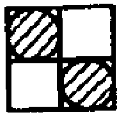
Figure 14D:
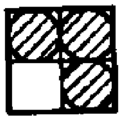
Figure 14E:
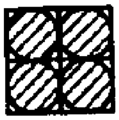
Figure 15:
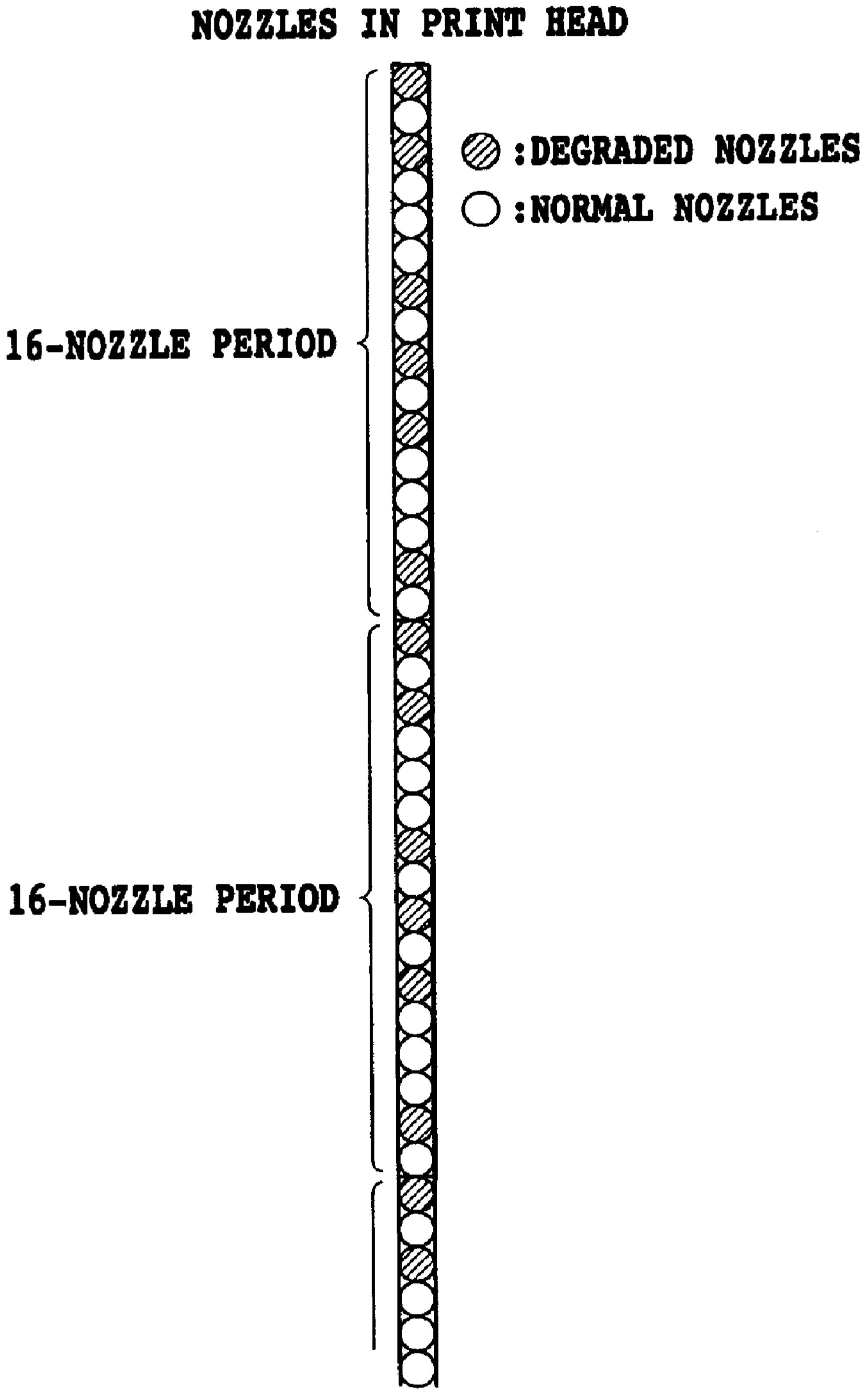
FIG. 15 is a view illustrating degraded nozzles appearing periodically in print head of a conventional apparatus which has been used for a long time.

Then, if an image for the second page is printed, then during the first scan, null data (that does not cause any ink to be ejected) is added as image data for the upper two of the 1,280 nozzles of the print head 22 corresponding to the width W. Then, on the basis of its correspondences to the nozzles, the image data is shifted downward by an amount corresponding to the additional two nozzles. Then, the printing sheet is not printed for a width W1 corresponding to the upper two nozzles but for a width (W-W1) corresponding to the remaining 1,278 nozzles. Accordingly, if the nozzles are denoted by the respective nozzle numbers 1 to 1,280 starting with the uppermost nozzle in FIGS. 12A and 12B, then during the first scan, the original image data otherwise associated with the nozzles 1 to 1,278 are associated with the nozzles 3 to 1,280. The original image data otherwise associated with the nozzles 1,279 and 1,280 are associated with the nozzles 1 and 2 during the second scan. Therefore, during the second and subsequent scans, the nozzles 1 and 2 are associated with image data corresponding to the nozzles 1,279 and 1,280 present during the last scan. Thus, during the second and subsequent scans, the printing sheet is printed for the width W corresponding to the 1,280 nozzles in the print head 22 as in the conventional manner so that printed images sequentially succeed the image printed during the first scan. Thus, the entire image is printed in the second page of the printing sheet.

Then, if an image for the third page is printed, then during the first scan, null data (that does not cause any ink to be ejected) is added as image data for the upper four of the 1,280 nozzles of the print head 22 corresponding to the width W. Then, on the basis of its correspondences to the nozzles, the image data is shifted downward by an amount corresponding to the additional four nozzles. Then, the printing sheet is not printed for a width corresponding to the upper four nozzles but for a width corresponding to the remaining 1,276 nozzles. Accordingly, during the first scan, the original image data otherwise associated with the nozzles 1 to 1,276 are associated with the nozzles 5 to 1,280. The original image data otherwise associated with the nozzles 1,277 and 1,280 are associated with the nozzles 1 and 4 during the second scan. Therefore, during the second and subsequent scans, the nozzles 1 and 4 are associated with the image data corresponding to the nozzles 1,277 to 1,280 present during the last scan. In this manner, during the second and subsequent scans, the printing sheet is printed for the width W corresponding to the 1,280 nozzles in the print head 22 as in the conventional manner so that printed images sequentially succeed the image printed during the first scan. Thus, the entire image is printed in the third page of the printing sheet.

Similarly, during the first scan for printing of an image for each of the fourth, fifth, sixth, and seventh pages, null data is added as image data corresponding to the upper 6, 8, 10, 12 nozzles, respectively. Further, the image data is shifted downward by an amount corresponding to the upper 6, 8, 10, 12 nozzles, to print the printing sheet for a width corresponding to the 1,274, 1,272, 1,270, or 1,268 nozzles, respectively. During the first scan for printing of an image for the eighth page, null data is added as image data corresponding to the upper 14 nozzles. Further, the image data is shifted downward by an amount corresponding to the upper 14 nozzles, to print the printing sheet for a width corresponding to the 1,266 nozzles.

Figure 17:
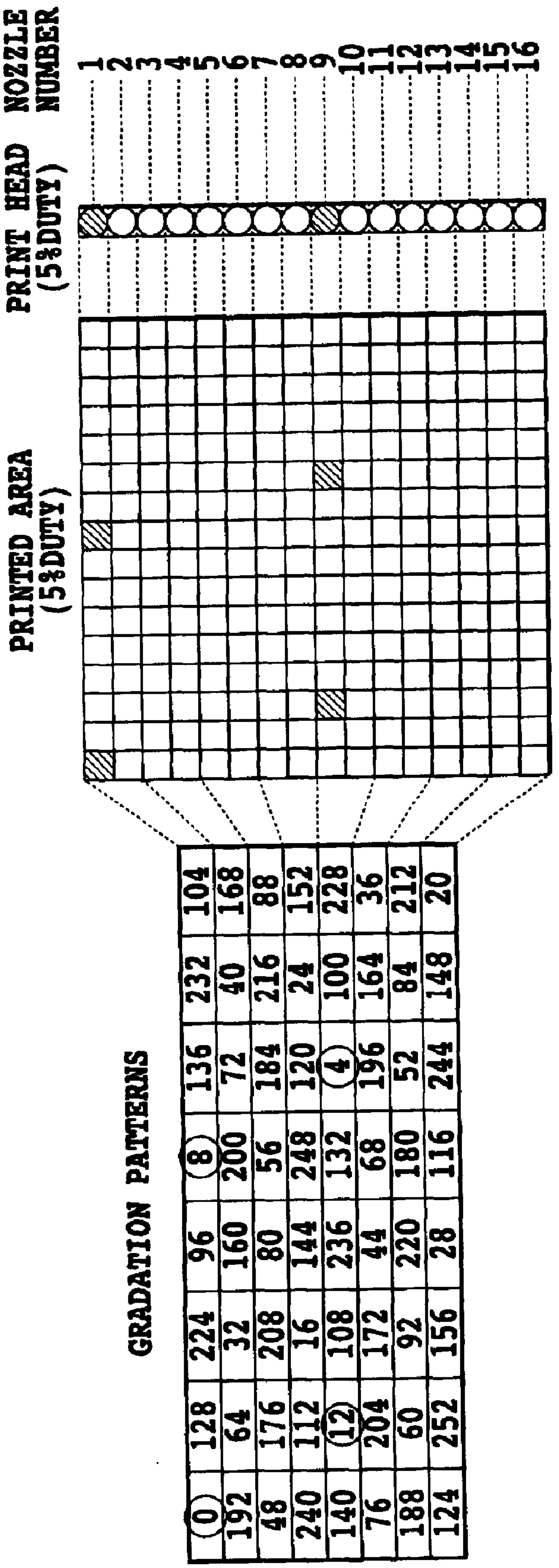
FIG. 17 is a view illustrating correspondences between gradation patterns used in a conventional example and the use frequency of nozzles.

In the present embodiment, a printing operation is repeated by setting the printing of the first to eighth pages to be one period. Specifically, whenever one page of image is printed, the correspondences between the nozzles and the image data are changed by an amount corresponding to two nozzles. The correspondences are changed seven times before eight pages of images are printed. Consequently, the correspondences between the nozzles and the image data are changed by an amount corresponding to 14 (=2×7) nozzles. Therefore, while the images for the first to eighth pages are being printed, the correspondences between the nozzles and the image data are sequentially changed by 0, 2, 4, 6, 8, 10, 12, and 14 nozzles. By setting this operation to be one period, images for the ninth and subsequent pages are repeatedly printed. Thus, the amount by which the correspondences between the nozzles and the image data are sequentially changed is inevitably smaller than the size (L=16) of the gradation patterns in the sub-scanning direction as shown in FIGS. 13 and 17. Further, by thus changing the correspondences between the nozzles in the print head 22 and the print data for each page of the printing sheet, the null data added during the first scan results in a blank at the leading end of the printing sheet 1 in which no images are printed. The blank resulting from the addition of the null data has a small width corresponding to 14 rasters provided by up to 14 nozzles. Consequently, the deviation of the printed position of the image is not very significant but is preferably avoided. Thus, in order to eliminate completely the deviation of the printed position of the image, the blank corresponding to null data may be set in a blank area at the leading end of the printing sheet 1. For example, by assigning null data to the terminal nozzles passing over the blank area at the leading end of the printing sheet 1, the blank resulting from the addition of the null data can be set within the blank area at the leading end of the printing sheet 1. To achieve this the amount by which the printing sheet is conveyed before being set at a print start position may be controlled for each page, and the nozzles to which null data is assigned may be located within the blank area at the leading end of the printing sheet 1. More specifically, the amount by which the printing sheet 1 is conveyed during the above setting operation is controlled to be reduced as the amount of null data added increases so that the blank area has the same width in each page.

As a result, the use frequency of the nozzles in FIGS. 9B to 9F can be distributed as shown in FIGS. 11B to 11F to make surely the use frequency of all the nozzles in the print head 22 uniform. For example, in FIG. 9B, four (nozzle numbers 1, 2, 9, and 10) of the 16 nozzles are each used once, i.e. ink ejection is carried out four times. In contrast, in FIG. 11B, the four nozzle operations are distributed among the 16 nozzles to make the use frequency of all the nozzles uniform at 0.25.

By thus making the use frequency of the nozzles uniform, it is avoidable to reflect significantly the characteristics of particular nozzles in printed images of lower densities such as characters in a document or illustrations. It is also possible to reduce the possibility of the degradation of a printed image resulting from the degradation of particular nozzles. The degraded nozzles may cause, for example, a variation in the ink ejection direction, a variation in the amount of ink ejected, or even the inability to eject ink.

In the present embodiment, during the first scan, the positions of the operated nozzles are changed for each page of the printed image. However, the present invention is not limited to this aspect. For example, if the positions of the operated nozzles for the first scan of the print head cannot be changed for each page of the printing sheet on which the image is printed, then the positions may be changed every time a certain number of print sheets are printed. In this case, the use frequency of all nozzles in the print head can be made uniform by increasing the number of nozzles that perform printing over a long period.

In the present embodiment, the 2×2 dot patterns correspond to the common gradation patterns based on the systematic dither method. Further, the dot patterns are not only changed for each scan of the print head 1 but the positions of the nozzles used during the first scan are changed for each page of the printed image. This makes it possible to avoid the degradation of images attributed to the biased use of particular nozzles, which is a problem with the recent ink jet apparatuses.

In the present embodiment, since the 2×2 dot patterns are used, the positions of the nozzles used during the first scan are changed by the amount corresponding to two nozzles. However, the present invention is not limited to this aspect. Similar effects can be produced by setting the positions of the nozzles used during the first scan equal to the vertical size of the dot patterns or changing these positions by an amount corresponding to one nozzle.

Further, in order to shift the correspondences between the nozzles and the image data, a predetermined number of nozzles may also be disabled, instead of the use of null data as in the case with the present embodiment, so that the image data can be shifted by an amount corresponding to the disabled nozzles. Furthermore, the correspondences between the nozzles and the image data may be changed for each print job or every time a certain number of printing sheets are printed, rather then for each page. Moreover, as described above, the dot patterns may be changed for each printing scan, each page, or each job or every time a certain number of printing sheets are printed. A specific form of a printing operation comprises using null data to shift the correspondences between the nozzles and image data for each page, while changing the dot pattern for each page.

If the correspondences between the nozzles and image data are shifted, while the dot patterns are changed for each page, then a small difference in image quality associated with the switching of the dot pattern is less marked because it appears between pages. If the correspondences between the nozzles and image data are shifted, while the dot patterns are changed for each job, then a small difference in image quality associated with the switching of the dot pattern is less marked because it appears between jobs. If the correspondences between the nozzles and image data are shifted, while the dot patterns are changed every time a certain number of sheets are printed, then a small difference in image quality associated with the switching of the dot pattern is less marked because it appears after the certain number of print sheets have been printed.

(Others)

The present invention is applicable to all appliances using a printing medium such as paper, cloth, leather, nonwoven cloth, OHP sheet, and metal. Specific examples of the appliances include office-equipment such as printers, copiers, and facsimiles, and industrial manufacturing machines.

In the present embodiment, ink contained in the ink tank is ejected from the print head. However, the present invention is not limited to this aspect. For example, a liquid for increase the fixity and water resistance of the printed image or increase the image quality may be contained in ink tank so as to eject from the print head onto the printing medium.

The present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal.

As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 59-123670 (1984) and 59-138461 (1984) in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consist of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system are a capping means and a cleaning means for the recording head, and a pressure or suction means for the recording head. Examples of the preliminary auxiliary system are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink maybe retained in recesses or through holes formed in a porous sheet as liquid or solid substances so that the ink faces the electrothermal transducers as described in Japanese Patent Application Laying-open Nos. 54-056847 (1979) or 60-071260 (1985). The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention is applicable to a system comprised of a plurality of appliances (such as host computer, interface, reader, and printer) or a equipment comprised of one appliance (such as copier, and facsimile).

The object of the present invention can also be achieved by supplying the medium which records the software program codes for realizing the functions in the above embodiments to a system or an apparatus and letting those program codes read by the system or a computer (or the CPU/MPU) of the apparatus from the medium. In this case, the program codes read from the recording medium realizes the functions of the object embodiment and the recording medium storing the program codes comes to compose the present invention. The recording medium for supplying the above program codes may be, for example, a floppy disk, a hard disk, an optical disk, an optical magnetic disk, a CD-ROM, a CD-R, a magnetic tape, a non-volatile memory card, a ROM, or the like. The present invention also includes a case in which the functions of the embodiments described above are realized through some or the whole of the actual processings executed not only by a computer which reads and executes the program codes, but also by an OS (Operating System) running on a computer according to the directions of the program codes.

The present invention also includes a case in which the program codes read from the recording medium are written in a memory provided in a function extension board set in a computer or a function extension unit connected to the computer, then the function extension board or the CPU of the function extension unit executes some or the whole processings according to the directions of the program codes, thereby realizing the functions of the embodiments described above.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An ink jet printing apparatus based on a serial scan method which prints on a printing medium by using a print head formed with a plurality of nozzles through which ink can be ejected and selectively ejecting ink through the plurality of nozzles in said print head in accordance with dot patterns of dot matrices corresponding to respective gradation values, on the basis of image data converted into n values, where $n \geqq 3$, using gradation patterns for a systematic dither method, the apparatus comprising:

main scanning means for scanning said print head over said printing medium in a sub-scanning direction different from a direction in which said nozzles are arranged;

conveying means for conveying said printing medium by a predetermined amount K, where $K=a \times L$, wherein a is a natural number and L is . . . are arranged, or $K=L/b$, wherein b is a natural number, in the direction in which said nozzles are arranged, between a preceding scan and a next scan of the print head executed by said main scanning means;

first changing means for shifting correspondences between the image data and said plurality of nozzles in the direction in which said nozzles are arranged; and second changing means for changing operated dot patterns so as to allow the selective use of a plurality of different dot patterns indicating the same gradation value.

2. An ink jet printing apparatus as claimed in claim 1, wherein said first changing means shifts the correspondences between said image data and said plurality of nozzles so as to reduce the number of nozzles through which ink is ejected during a first main scan of said print head.

3. An ink jet printing apparatus as claimed in claim 1, wherein said first changing means adds data that does not cause any ink to be ejected, as image data corresponding to the first main scan of said print head, to shift the correspondences between said image data and said plurality of nozzles by an amount corresponding to the added data.

4. An ink jet printing apparatus as claimed in claim 3, wherein nozzles corresponding to the data added by said first changing means pass through a blank area at a leading end of said printing medium during the first main scan of said print head.

5. An ink jet printing apparatus as claimed in claim 1, wherein said first changing means shifts the correspondences between said image data and said plurality of nozzles and said second changing means changes said dot patterns, for each page or each print job or every time a certain number of print sheets are printed.

6. An ink jet printing apparatus based on a serial scan method which prints on a printing medium by using a print head formed with a plurality of nozzles through which ink can be ejected and selectively ejecting ink through the plurality of nozzles in said print head in accordance with dot patterns of dot matrices corresponding to respective gradation values, on the basis of image data converted into n values, where $n \geqq 3$, using gradation patterns for a systematic dither method, the apparatus comprising:

main scanning means for scanning said print head over said printing medium in a sub-scanning direction different from a direction in which said nozzles are arranged;

conveying means for conveying said printing medium by a predetermined amount K, where K=a×L, wherein a is a natural number and L is . . . are arranged, or K=L/b, wherein b is a natural number, in the direction in which said nozzles are arranged, between a preceding scan and a next scan of the print head executed by said main scanning means; and changing means for changing operated dot patterns so as to allow the selective use of a plurality of different dot patterns indicating the same gradation value, wherein said changing means changes said dot patterns for each main scan, each page, or each print job or every time a certain number of print sheets are printed.

7. An ink jet printing apparatus based on a serial scan method which prints on a printing medium by using a print head formed with a plurality of nozzles through which ink can be ejected and selectively ejecting ink through the plurality of nozzles in said print head in accordance with dot patterns of dot matrices corresponding to respective gradation values, on the basis of image data converted into n values, where n>3, using gradation patterns for a systematic dither method, the apparatus comprising:

main scanning means for scanning said print head over said printing medium in a sub-scanning direction different from a direction in which said nozzles are arranged;

conveying means for conveying said printing medium by a predetermined amount K, where K=a×L, wherein a is a natural number and L is . . . are arranged, or K=L/b, wherein b is a natural number, in the direction in which said nozzles are arranged, between a preceding scan and a next scan of the print head executed by said main scanning means; and changing means for shifting correspondences between the image data and said plurality of nozzles in the direction in which said nozzles are arranged, wherein the amount by which the correspondences are shifted by said changing means is less than said L.

8. An ink jet printing apparatus as claimed in claim 7, wherein said changing means shifts the correspondences between said image data and said plurality of nozzles so as to reduce the number of nozzles through which ink is ejected during a first main scan of said print head.

9. An ink jet printing apparatus as claimed in claim 7, wherein said changing means adds data that does not cause any ink to be ejected, as image data corresponding to the first main scan of said print head, to shift the correspondences between said image data and said plurality of nozzles by an amount corresponding to the added data.

10. An ink jet printing apparatus as claimed in claim 7, wherein said changing means shifts the correspondences between said image data and said plurality of nozzles for each page or each print job or every time a certain number of print sheets are printed.

11. An ink jet printing apparatus as claimed in claim 7, further comprising dot pattern changing means for changing operated dot patterns so as to allow the selective use of a plurality of different dot patterns indicating the same gradation value.

12. An ink jet printing apparatus as claimed in claim 11, wherein said dot pattern changing means changes said dot patterns for each main scan, each page, or each print job or every time a certain number of print sheets are printed.

13. An ink jet printing apparatus based on a serial scan method which prints on a printing medium by using a print head formed with a plurality of nozzles through which ink can be ejected and selectively ejecting ink through the plurality of nozzles in said print head in accordance with dot patterns of dot matrices corresponding to respective gradation values, on the basis of image data converted into n values, where n>3, using gradation patterns for a systematic dither method, the apparatus comprising:

main scanning means for scanning said print head over said printing medium in a sub-scanning direction different from a direction in which said nozzles are arranged;

conveying means for conveying said printing medium by a predetermined amount K, where K=a×L, wherein a is a natural number and L is . . . are arranged, or K=L/b, wherein b is a natural number, in the direction in which said nozzles are arranged, between a preceding scan and a next scan of the print head executed by said main scanning means;

first changing means for shifting correspondences between the image data and said plurality of nozzles in the direction in which said nozzles are arranged; and second changing means for changing operated dot patterns so as to allow the selective use of a plurality of different dot patterns indicating the same gradation value, wherein said first changing means adds data that does not cause any ink to be ejected, as image data corresponding to the first main scan of said print head, to shift the correspondences between said image data and said plurality of nozzles by an amount corresponding to the added data, and wherein said first changing means shifts the correspondences between said image data and said plurality of nozzles and said second changing means changes said dot patterns, for each page or each print job or every time a certain number of print sheets are printed.

14. An inkjet printing method based on a serial scan method which prints on a printing medium by using a print head formed with a plurality of nozzles through which ink can be ejected and selectively ejecting ink through the plurality of nozzles in said print head in accordance with dot patterns of dot matrices corresponding to respective gradation values, on the basis of image data converted into n values, where n≧3, using gradation patterns for a systematic dither method, the ink jet printing method comprising:

a main scanning step of scanning said print head over said printing medium in a sub-scanning direction different from a direction in which said nozzles are arranged;

a conveying step of conveying said printing medium by a predetermined amount K, where K=a×L, wherein a is a natural number and L is . . . are arranged, or K=L/b, wherein b is a natural number, in the direction in which said nozzles are arranged, between a preceding scan and a next scan of said print head;

a first changing step of shifting correspondences between the image data and said plurality of nozzles in the direction in which said nozzles are arranged; and a second changing step of changing operated dot patterns so as to allow the selective use of a plurality of different dot patterns indicating the same gradation value.

15. An inkjet printing method based on a serial scan method which prints on a printing medium by using a print head formed with a plurality of nozzles through which ink can be ejected and selectively ejecting ink through the plurality of nozzles in said print head in accordance with dot patterns of dot matrices corresponding to respective gradation values, on the basis of image data converted into n values, where n≧3, using gradation patterns for a systematic dither method, the ink jet printing method comprising:

a main scanning step of scanning said print head over said printing medium in a sub-scanning direction different from a direction in which said nozzles are arranged;

a conveying step of conveying said printing medium by a predetermined amount K, where K=a×L, wherein a is a natural number and L is . . . are arranged, or K=L/b, wherein b is a natural number, in the direction in which said nozzles are arranged, between a preceding scan and a next scan of said print head; and a changing step of changing operated dot patterns so as to allow the selective use of a plurality of different dot patterns indicating the same gradation value, wherein said changing step changes said dot patterns for each main scan, each page, or each print job or every time a certain number of print sheets are printed.

16. An ink jet printing method based on a serial scan method which prints on a printing medium by using a print head formed with a plurality of nozzles through which ink can be ejected and selectively ejecting ink through the plurality of nozzles in said print head in accordance with dot patterns of dot matrices corresponding to respective gradation values, on the basis of image data converted into n values, where n≧3, using gradation patterns for a systematic dither method, the ink jet printing method comprising:

a main scanning step of scanning said print head over said printing medium in a sub-scanning direction different from a direction in which said nozzles are arranged;

a conveying step of conveying said printing medium by a predetermined amount K, where K=a×L, wherein a is a natural number and L is . . . are arranged, or K=L/b, wherein b is a natural number, in the direction in which said nozzles are arranged, between a preceding scan and a next scan of said print head; and a changing step of shifting correspondences between the image data and said plurality of nozzles in the direction in which said nozzles are arranged, wherein the amount by which the correspondences are shifted by said changing means is less than said L.

17. An ink jet printing method based on a serial scan method which prints on a printing medium by using a print head formed with a plurality of nozzles through which ink can be ejected and selectively ejecting ink through the plurality of nozzles in said print head in accordance with dot patterns of dot matrices corresponding to respective gradation values, on the basis of image data converted into n values, where n≧3, using gradation patterns for a systematic dither method, the ink jet printing method comprising:

a main scanning step of scanning said print head over said printing medium in a sub-scanning direction different from a direction in which said nozzles are arranged;

a conveying step of conveying said printing medium by a predetermined amount K, where K=a×L, wherein a is a natural number and L is . . . are arranged, or K=L/b, wherein b is a natural number, in the direction in which said nozzles are arranged, between a preceding scan and a next scan of said print head;

a first changing step of shifting correspondences between the image data and said plurality of nozzles in the direction in which said nozzles are arranged; and a second changing step of changing operated dot patterns so as to allow the selective use of a plurality of different dot patterns indicating the same gradation value, wherein said first changing step adds data that does not cause any ink to be ejected, as image data corresponding to the first main scan of said print head, to shift the correspondences between said image data and said plurality of nozzles by an amount corresponding to the added data, and wherein said first changing step shifts the correspondences between said image data and said plurality of nozzles and said second changing step changes said dot patterns, for each page or each print job or every time a certain number of print sheets are printed.

18. A program for allowing a computer to execute said first changing step and said second changing step of the ink jet printing method as claimed in claim 17.

* * * * *

UNITED STATES PATENT AND TRADEMARK OFFICE

CERTIFICATE OF CORRECTION

PATENT NO. : 6,896,348 B2
APPLICATION NO. : 10/623543
DATED : May 24, 2005
INVENTOR(S) : Rie Takekoshi et al.

It is certified that error appears in the above-identified patent and that said Letters Patent is hereby corrected as shown below:

COLUMN 19:

Line 23, "maybe" should read --may be--.

COLUMN 20:

Line 22, "L is . . ." should read --L is the size of said gradation patterns in the direction in which said nozzles--.

COLUMN 21:

Line 3, "L is . . ." should read --L is the size of said gradation patterns in the direction in which said nozzles--.
Line 21, "where n>3," should read --where $n \geq 3$,--.
Line 29, "L is . . ." should read --L is the size of said gradation patterns in the direction in which said nozzles--.

COLUMN 22:

Line 3, "where n>3," should read --where $n \geq 3$,"--.
Line 10, "L is . . ." should read --L is the size of said gradation patterns in the direction in which said nozzles--.
Line 46, "L is . . ." should read --L is the size of said gradation patterns in the direction in which said nozzles--.

UNITED STATES PATENT AND TRADEMARK OFFICE
CERTIFICATE OF CORRECTION

PATENT NO. : 6,896,348 B2 
APPLICATION NO. : 10/623543
DATED : May 24, 2005
INVENTOR(S) : Rie Takekoshi et al.

It is certified that error appears in the above-identified patent and that said Letters Patent is hereby corrected as shown below:

COLUMN 23:

Line 3, "L is . . ." should read --L is the size of said gradation patterns in the direction in which said nozzles--.
Line 27, "L is . . ." should read --L is the size of said gradation patterns in the direction in which said nozzles--.

COLUMN 24:

Line 12, "L is . . ." should read --L is the size of said gradation patterns in the direction in which said nozzles--.

Signed and Sealed this

Fifth Day of September, 2006

JON W. DUDAS
*Director of the United States Patent and Trademark Office*